United States Patent
Robshaw et al.

(10) Patent No.: US 9,940,490 B1
(45) Date of Patent: Apr. 10, 2018

(54) ENHANCED RFID TAG AUTHENTICATION

(71) Applicant: Impinj, Inc., Seattle, WA (US)

(72) Inventors: Matthew Robshaw, Seattle, WA (US); Harley Heinrich, Snohomish, WA (US); Yael Maguire, Boston, MA (US); Theron Stanford, Seattle, WA (US); Christopher J. Diorio, Shoreline, WA (US); Scott A. Cooper, Seattle, WA (US)

(73) Assignee: IMPINJ, INC., Seattle, WA (US)

( * ) Notice: Subject to any disclaimer, the term of this patent is extended or adjusted under 35 U.S.C. 154(b) by 635 days.

(21) Appl. No.: 14/106,522

(22) Filed: Dec. 13, 2013

Related U.S. Application Data

(63) Continuation-in-part of application No. 13/308,123, filed on Nov. 30, 2011, now abandoned.

(60) Provisional application No. 61/737,376, filed on Dec. 14, 2012.

(51) Int. Cl.
*H04L 9/32* (2006.01)
*G06K 7/10* (2006.01)

(52) U.S. Cl.
CPC ........ *G06K 7/10257* (2013.01); *H04L 9/3263* (2013.01); *H04L 9/3273* (2013.01); *H04L 2209/805* (2013.01)

(58) Field of Classification Search
None
See application file for complete search history.

(56) References Cited

U.S. PATENT DOCUMENTS

| | | | | |
|---|---|---|---|---|
| 5,467,081 A | * | 11/1995 | Drews ................. | G06K 7/0008 340/10.51 |
| 6,842,106 B2 | * | 1/2005 | Hughes ................ | G06F 21/31 340/10.1 |
| 7,450,010 B1 | | 11/2008 | Gravelle et al. | |
| 7,532,104 B2 | * | 5/2009 | Juels .................... | H04L 9/3273 340/10.1 |
| 7,734,046 B2 | | 6/2010 | Urban et al. | |
| 7,791,451 B2 | * | 9/2010 | Lei ...................... | H04L 63/0492 340/10.1 |
| 8,049,594 B1 | * | 11/2011 | Baranowski ......... | H04L 9/3271 340/10.1 |
| 8,154,405 B2 | * | 4/2012 | Gravelle .............. | G06F 21/606 235/492 |
| 8,373,786 B2 | | 2/2013 | Otsuka et al. | |

(Continued)

OTHER PUBLICATIONS

Office Action received for U.S. Appl. No. 14/677,219 dated Oct. 7, 2015 and filed on Apr. 2, 2015.

(Continued)

*Primary Examiner* — Brian Zimmerman
*Assistant Examiner* — Sara Samson
(74) *Attorney, Agent, or Firm* — Turk IP Law, LLC

(57) ABSTRACT

An authentication method includes RFID tags authenticating RFID readers. A tag sends a tag identifier and a reader challenge to a reader in response to one or more commands from the reader. The reader then either derives a response to the reader challenge itself or has a verification authority derive the response. The response may be derived from parameter(s) in the reader challenge, and may be derived using a cryptographic key. The reader then sends the response to the tag along with another command. The tag verifies the response before executing instruction(s) included in the command.

20 Claims, 20 Drawing Sheets

(56) References Cited

U.S. PATENT DOCUMENTS

| | | | |
|---|---|---|---|
| 8,378,786 B2 | 2/2013 | Bailey et al. | |
| 8,595,506 B2* | 11/2013 | Robshaw | G06F 21/10 |
| | | | 713/182 |
| 8,866,594 B1* | 10/2014 | Diorio | G06K 7/10297 |
| | | | 340/10.42 |
| 9,024,729 B1 | 5/2015 | Diorio et al. | |
| 9,111,283 B1* | 8/2015 | Diorio | H04L 9/3247 |
| 9,405,945 B1 | 8/2016 | Diorio et al. | |
| 2006/0077034 A1 | 4/2006 | Hillier | |
| 2006/0187048 A1 | 8/2006 | Curkendall et al. | |
| 2007/0106897 A1 | 5/2007 | Kulakowski | |
| 2008/0258864 A1 | 10/2008 | Hattori et al. | |
| 2010/0001840 A1* | 1/2010 | Kang | H04Q 9/00 |
| | | | 340/10.1 |
| 2011/0066853 A1 | 3/2011 | Engels et al. | |
| 2012/0200386 A1* | 8/2012 | Robshaw | H04L 9/3013 |
| | | | 340/5.8 |
| 2013/0043982 A1* | 2/2013 | Robshaw | H04W 12/06 |
| | | | 340/10.1 |
| 2014/0023195 A1 | 1/2014 | Lee et al. | |

OTHER PUBLICATIONS

Office Action received for U.S. Appl. No. 13/441,285, dated Aug. 12, 2014 and filed on Apr. 6, 2012.
Final Office Action received for U.S. Appl. No. 13/308,123, dated May 22, 2014 and filed on Nov. 30, 2011.
Office Action received for U.S. Appl. No. 13/308,123, dated Oct. 8, 2013 and filed on Nov. 30, 2011.
Office Action received for U.S. Appl. No. 14/602,173, dated May 2, 2016 and filed on Jan. 21, 2015.
Office Action received for U.S. Appl. No. 14/207,525, dated Apr. 29, 2016 and filed on Mar. 12, 2014.
"Non-Final Office Action Issued in U.S. Appl. No. 14/602,173" dated Feb. 15, 2017, 17 Pages.

* cited by examiner

ARCHITECTURE OF INTERFACE CONVERTER
WITH AGENT AND UTILITY

SAMPLE SCREENSHOT OF INTERFACE
CONVERTER EXPOSING TO AGENT OPTIONS TO
CONTROL FUNCTIONALITY OF TAG
AUTHENTICATION UTILITY

ENHANCED RFID TAG AUTHENTICATION

CROSS REFERENCE TO RELATED APPLICATIONS

This application is a continuation-in-part of U.S. patent application Ser. No. 13/308,123 filed on Nov. 30, 2011. This application also claims the benefit of U.S. Provisional Patent Application Ser. No. 61/737,376 filed on Dec. 14, 2012. The disclosures of these applications are hereby incorporated by reference for all purposes.

BACKGROUND

Radio-Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on.

An RFID tag typically includes an antenna subsystem and a radio subsystem including a modem, a power management section, a logical section, and a memory. In some RFID tags the logical section may include a cryptographic algorithm which, in many instances, relies on one or more passwords or keys stored in tag memory. In some RFID tags the power management section may include an energy storage device such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

Counterfeiting is a problem in many areas of global commerce. For example, retail-goods manufacturers, such as manufacturers of luxury clothing or purses, often find counterfeit items in the marketplace. Many commercial enterprises envision using cryptographically secure RFID systems to ascertain whether a tagged item, or more particularly the tag attached to an item, is genuine and not counterfeit. However, these commercial applications are loathe to adopt anticounterfeiting systems that require password or key distribution, because securely managing and distributing passwords or keys among global trading partners is difficult.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments are directed to authenticating an RFID reader to an RFID tag. A tag may send a tag identifier and a reader challenge to a reader in response to one or more commands from the reader. The reader may then either derive a response to the reader challenge itself or have a verification authority derive the response. The response may be derived from parameter(s) in the reader challenge, and may be derived using a cryptographic key. The reader then sends the response to the tag along with another command. The tag then verifies the response before executing instruction(s) included in the command.

Other embodiments are directed to the authentication of RFID tags using symmetric or asymmetric cryptography. Where symmetric cryptography is used, a tag manufacturer or other legitimate entity generates a tag secret key, writes the tag secret key into a region of tag memory that is not readable by readers (i.e., not externally readable), and provides the tag secret key to one or more verification authorities. Where asymmetric cryptography is used, the tag manufacturer/legitimate entity generates a private-public tag key pair, writes the tag private key into a region of tag memory that is not externally readable, and writes the tag public key into a region of tag memory that is readable by readers (i.e., externally readable). A tag manufacturer or other legitimate entity (such as a signing authority and hereafter denoted as a signing authority) generates a master private-public key pair, stores the master private key in a secure location, and distributes the master public key to readers in the field.

According to embodiments, the signing authority generates a tag-specific digital signature by signing and/or encrypting at least the tag public key with the master private key, and stores the digital signature into a region of tag memory that is readable by readers (i.e., externally readable). A reader in the field may then subsequently authenticate the tag without network access and without any stored keys except the single master public key, as described below.

Further embodiments are directed to the usage of tag coupons for RFID tag authentication. A tag coupon is a pre-computed cryptographic value used to facilitate a cryptographic transaction between an RFID tag and another entity (e.g., a reader) by reducing the computation performed by the tag. A reader may determine whether to perform tag authentication using tag coupons or not, based on whether the reader can access a verification authority.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
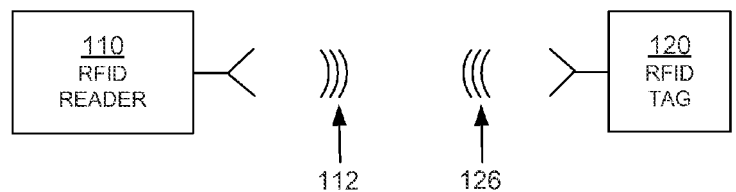
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. A "command" refers to a reader request for one or more tags to perform one or more actions. A command typically includes one or more tag instructions that cause a tag to perform one or more actions and a command code that identifies the command and/or the tag instructions. "Protocol" refers to an industry standard for communications between a reader and a tag (and vice versa), such as the Class-1 Generation-2 UHF RFID Protocol for Communications at 860 MHz-960 MHz by EPCglobal, Inc. ("Gen2 Specification"), versions 1.2.0 and 2.0 of which are hereby incorporated by reference.

In some applications, RFID systems are called upon to ensure the authenticity of an item to which a tag is attached. In these systems a reader challenges the tag and asks the tag to "prove" that it is genuine and not counterfeit. If the tag is genuine, then the item to which it is attached is presumed also to be genuine, especially if the tag is embedded into or onto the item and is difficult to alter or remove. In this case the task of preventing an item from being counterfeited essentially becomes a task of preventing the tag that is attached to the item from being counterfeited.

Preventing a tag from itself being counterfeited is difficult. For example, one way in which a tag can be counterfeited is by using a replay attack. In a replay attack, a counterfeiter listens to the communications between a reader and a legitimate tag and creates a counterfeit tag that mimics or "clones" the legitimate tag's response. To prevent such cloning, each time a reader challenges a tag both the reader and the tag should send different and unpredictable (at least unpredictable by the counterfeiter) messages. Typical cryptographic systems provide such unpredictability by having the reader send a different random challenge to the tag for each authentication, and having the tag generate a different response for each random challenge. In many systems the tag also adds some of its own randomness to the challenge so as to further confound replay attacks. Many challenge-response methods are known and applicable to this use case. Some challenge-response methods use what are known as symmetric cryptographic algorithms, such as the Advanced Encryption Standard (AES). Others use what are known as asymmetric or public key cryptographic algorithms, such as the Rivest/Shamir/Adleman (RSA) algorithm.

Regardless of whether an RFID system uses a symmetric or an asymmetric cryptographic algorithm, each tag contains a stored secret, also known as a secret key, a private key, or sometimes just a key. Symmetric algorithms typically denote the stored secret as a "secret key". Asymmetric algorithms typically denote the stored secret as a "private key". For symmetric algorithms, the secret key is known to the interrogating reader but not to a counterfeiter. For asymmetric algorithms, only the tag knows its private key, but the tag discloses a public key which is freely available to readers and to potential counterfeiters alike. In either case, to authenticate a tag the reader sends a random challenge; the tag uses its cryptographic algorithm to compute a response from the challenge and its stored secret; the tag sends the response to the reader; and the reader verifies the response by decrypting it using the tag's secret key (symmetric algorithm) or public key (asymmetric algorithm). Of course, if all tags contained the same stored secret then the system would not be particularly secure, because if a counterfeiter managed to reverse-engineer a single tag and uncover the stored secret, then he knows the stored secret for all tags. To remedy this problem, RFID systems may use a multitude of stored secrets, ideally allocating a unique stored secret for each and every tag.

This approach appears simple and secure, but is problematic from a commercial standpoint. RFID tag vendors already sell billions of tags per year, and will sell tens of billions of tags per year in the very near future. With this massive proliferation of tags there will be a consequent proliferation of stored secrets and public keys, and no reader can possibly hope to store all keys for all tags. Worse, for a symmetric algorithm, suppose that a single reader did store all the secret keys. In this latter case a counterfeiter merely has to steal a single reader and "break" it to know all the secret keys for potentially billions of tags. For these reasons, a particular reader cannot or should not know every tag's secret key or public key, and without knowing a tag's secret or public key the reader cannot authenticate the tag.

One possible alternative for systems using asymmetric cryptographic algorithms is for the tag to store both the private and public key, and to divulge its public key upon interrogation by a reader. However, this solution is flawed, because a counterfeiter could then simply create counterfeit tags with legitimate private/public key pairs and readers will not be able to distinguish them from legitimate tags.

Described herein is a tag authentication algorithm that addresses the above issues by allowing each tag to store a unique secret while not requiring a reader to store a large number of keys. Moreover, this algorithm does not require a reader to access a network for each tag authentication.

In a first step of the authentication, the reader interrogates the tag and retrieves the tag's public key and an electronic signature signing the tag's public key. Subsequently, the reader uses a master public key and the asymmetric algorithm to verify the electronic signature and thereby ensure that tag's public key was signed by the signing authority.

A reader determining that a tag's electronic signature is legitimate does not necessarily mean that the tag is genuine—indeed, a counterfeiter could have read a tag public key and an electronic signature from a legitimate tag and copied them into a cloned tag. What a legitimate signature does say is that the tag public key is genuine. To verify that the tag is itself genuine, the reader then challenges the tag with a random challenge and the tag replies with a tag response encrypted using the tag's private key. Finally, the reader decrypts the tag's response using the tag's public key. If the response decrypts correctly then the reader can be certain that the tag is genuine, because the reader has previously ascertained that the tag's public key was genuine, and only an authentic tag can know the tag private key that corresponds to the tag public key. This addresses the issue of a counterfeiter copying an authentic tag's public key into a counterfeit tag, because the counterfeiter cannot know the authentic tag's private key and so cannot likewise copy the tag's private key into the counterfeit tag. Without the tag's private key, the counterfeit tag cannot form a response to a challenge that will decrypt correctly using the tag's public key.

In embodiments as described herein every tag can have a unique private-public key pair but the reader only needs to store a single master public key. Of course, actual system implementations may choose to use more than one master private-public key pair, so that if one master key pair is compromised then not all tags are compromised, but the number of master key pairs can be much smaller than the number of tags deployed in the field. Finally, the reader is able to verify tag authenticity without needing access to any secret or to a network.

Tag authentication as described above is advantageous when network connectivity is unreliable or nonexistent. However, if network connectivity is available, network-based authentication may be desirable, due to lower complexity and tag computational requirements. According to embodiments, an RFID reader may attempt to authenticate tags employing keys, as described above. The reader is connected to a verification authority that can determine which key a particular tag employs by using a tag identifier as a table lookup or input to an algorithmic key generator.

To authenticate a tag in these embodiments, the reader interrogates the tag to determine the tag identifier, challenges the tag with a random number or string, receives a response from the tag, and then sends the identifier, challenge, and response to the verification authority. In some applications each individual RFID tag or group of tags will contain a distinct key, and the verification authority can determine which key a particular tag employs by using the identifier as a table lookup or input to an algorithmic key generator. The tag computes its response from at least the challenge and the key, typically using a cryptographic algorithm. In some applications the tag may add some tag-generated randomness to the reader's challenge to enhance the security of the challenge-response algorithm. Because the verification authority must be able to reconstruct the challenge that the tag used in its computations, in these latter applications the tag either sends its tag-generated randomness to the reader for relaying to the verification authority, or provides sufficient information in its identifier and response for the verification authority to determine the tag-generated randomness algorithmically. In some applications, to further enhance security, the tag may encrypt its tag-generated randomness in an Initial Value (IV) and send the IV to the reader for relaying to the verification authority. In yet other applications the verification authority will generate the challenge and send it to the reader for relaying to the tag.

The verification authority uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the verification authority will send a reply to the phone indicating whether the item is authentic or counterfeit. In other applications, such as a pharmaceutical distributor using an RFID-enabled handheld reader to interrogate a shipment (such as a case of medicine), the verification authority may send a notification to a designated party such as the distributor's security office or, in some instances, directly to the police in the event of counterfeit medicine.

To truly authenticate a tag, the reader or designated party needs to know that the verification authority's reply or notification is genuine and has not been forged or altered. Said another way, the entity receiving the reply or notification needs to be able to verify that the reply or notification is from a trusted verification authority and was not forged by an illegitimate verification authority or altered during transmission.

In some applications the reader may have a need to authenticate itself to a verification authority or a tag. For an example why, suppose the converse, that the verification authority accepted tag-authentication requests from any reader. A counterfeiter could then manufacture counterfeit tags and, prior to releasing the tags into the field, test them by configuring an illegitimate reader to send a counterfeit tag identifier, challenge and response to the verification authority and thereby ascertain whether the verification authority accepts the counterfeit tags. To prevent counterfeiters from this and other potential abuses, the verification authority may choose to require that the reader authenticate itself prior to responding.

FIG. 1 is a diagram of the components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 communicate via waves 112 and 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

The communication between reader and tag uses symbols, also called RFID symbols. A symbol can be a delimiter, a calibration symbol, and so on. Symbols can be implemented for exchanging binary data, such as "0" and "1", if that is desired. When the symbols are processed internally by reader 110 and tag 120 they can be treated as values, numbers, and so on.

Tag 120 can be a passive tag, or an active or battery-assisted tag (i.e., having its own power source). When tag 120 is a passive tag, it is powered from wave 112.

Figure 2:
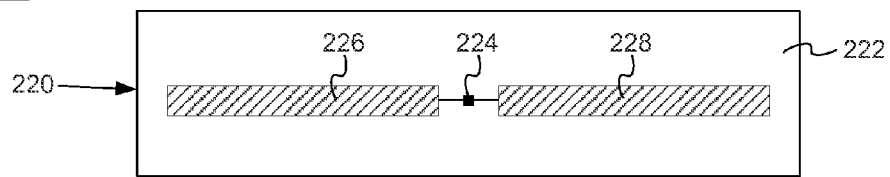
FIG. 2 is a diagram showing components of a passive RFID tag, such as a tag that can be used in the system of FIG. 1.
Figure 2:
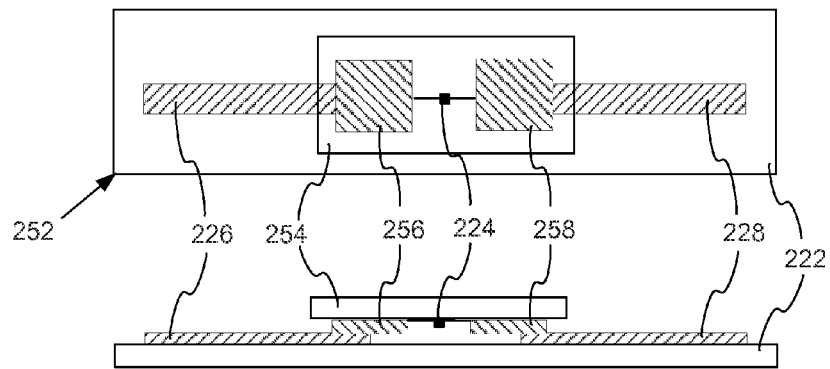
Figure 2:
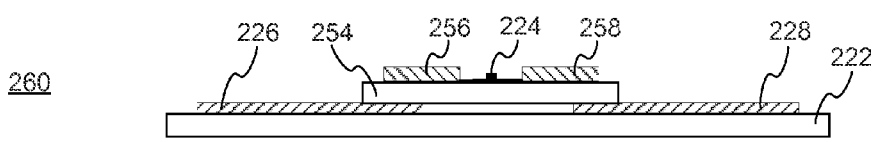

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein may mean that electrical coupling of one or more types (e.g., galvanic, capacitive, and/or inductive) is not present, at least to the extent possible. For example, elements that are electrically isolated from each other may be galvanically isolated from each other, capacitively isolated from each other, and/or inductively isolated from each other.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the antenna contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed, for example, by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna. The components of the RFID system of FIG. 1 may communicate with each other in any number of modes. One such mode is called full duplex. Another such mode is called half-duplex, and is described below.

Figure 3:
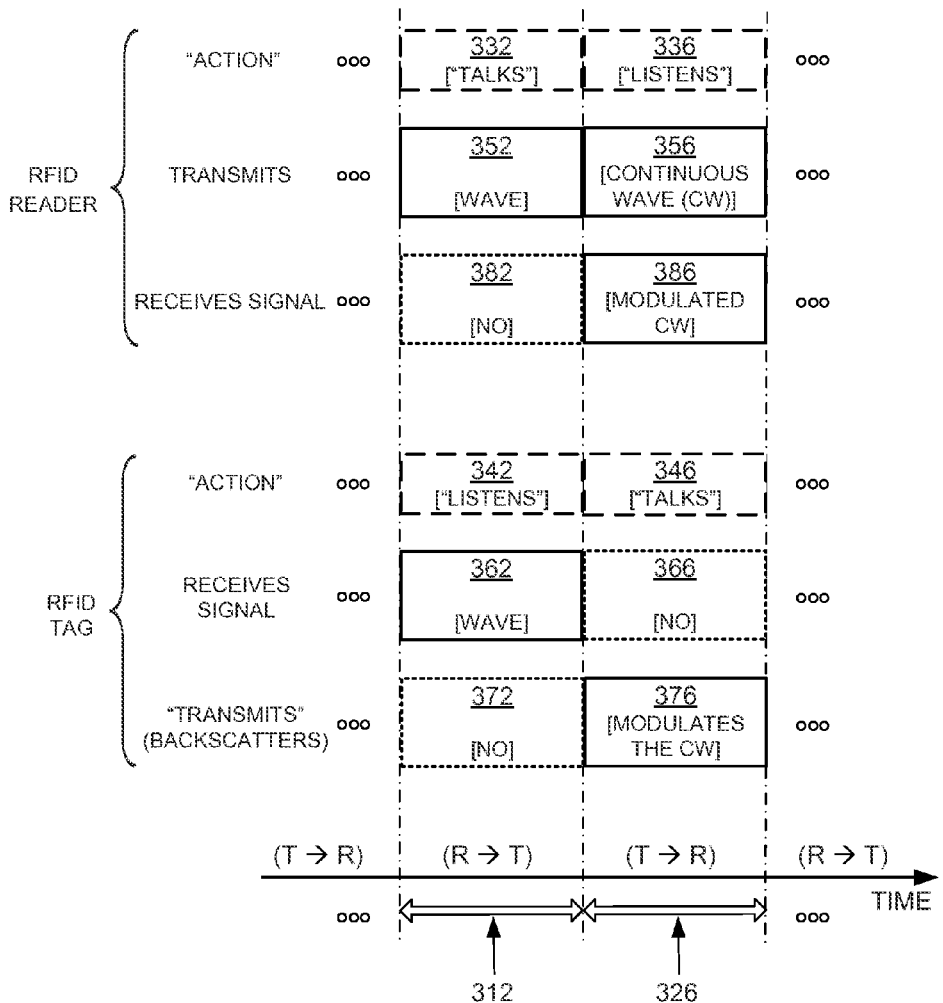
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that typically encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
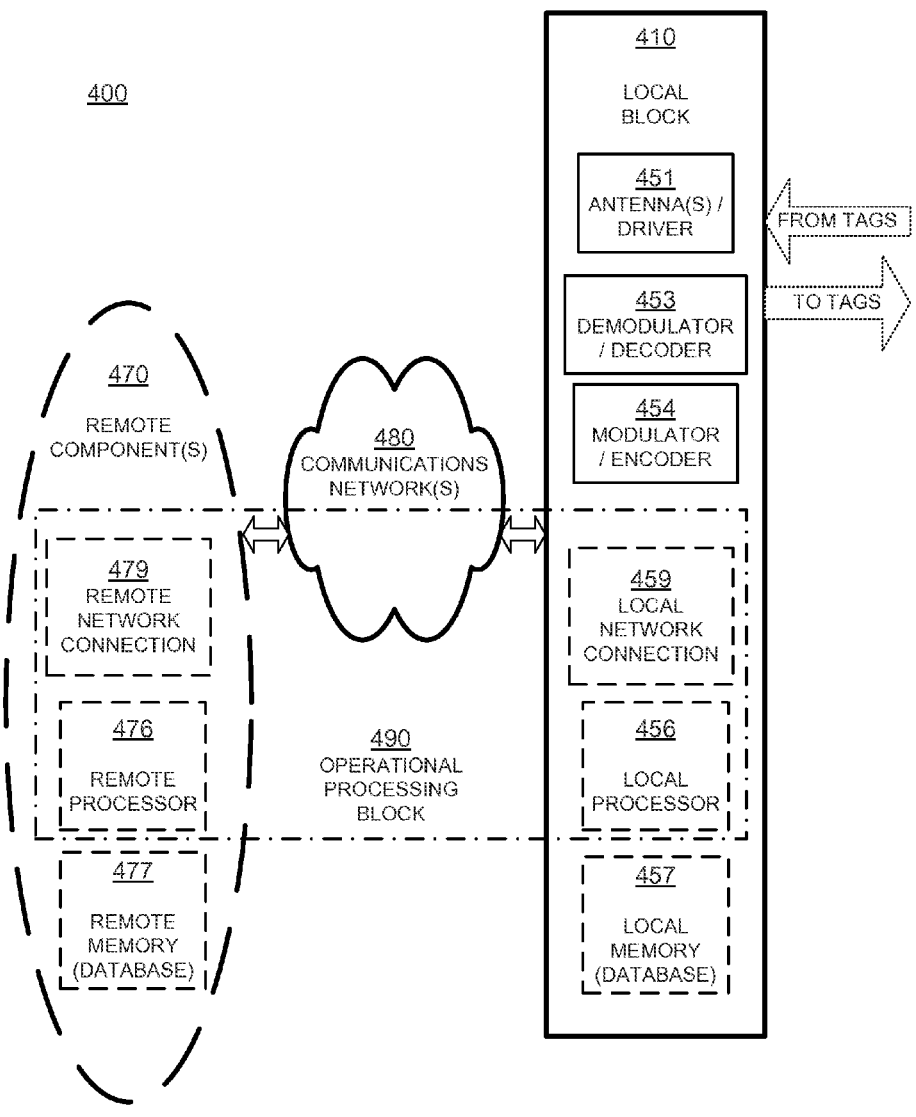
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 having an antenna and an antenna driver for communicating with the tags. Some readers, like that shown in local block 410, contain a single antenna and driver. Some readers contain multiple antennas and drivers and are capable of switching signals among them, including sometimes using different antennas for transmitting and for receiving. Some readers contain multiple antennas and drivers that can operate simultaneously. A demodulator/decoder block 453 demodulates and decodes backscattered signals received from the tags via antenna/driver block 451. Modulator/encoder block 454 encodes and modulates an RF signal that is to be transmitted to the tags via antenna/driver block 451.

In typical embodiments demodulator/decoder block 453 and modulator/encoder block 454 are operable to demodulate and modulate signals according to a protocol. In embodiments where multiple demodulators and/or multiple modulators are present, each may be configured to support different protocols or different sets of protocols. A protocol specifies, in part, how symbols are encoded for communication, and may include modulations, encodings, rates, timings, or any other parameters associated with data communications.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in a single chip with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. In turn, local block 410 then includes a local network connection 459 for communicating with communications network 480.

Communications on the network can be secure, such as if they are encrypted or physically protected, or insecure if they are not encrypted or otherwise protected.

There can be one or more remote component(s) 470. If there are more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an authentication function, similar to local processor 456.

Remote component(s) 470 can also include a remote memory 477. Remote memory 477 can be made in any way known in the art, such as was described with reference to local memory 457. Remote memory 477 may include a local database, and a remote database of a Standards Organization, such as one that can reference EPCs. Remote memory 477 may also contain information associated with command, tag profiles, keys, or the like, similar to local memory 457.

Of the above-described elements, it may be advantageous to consider a combination of these components, designated as operational processing block 490. Operational processing block 490 includes the following components, if present: local processor 456, remote processor 476, local network connection 459, remote network connection 479, and by extension an applicable portion of communications network 480 that links remote network connection 479 with local network connection 459, which may be dynamically changeable. In addition, operational processing block 490 can receive and decode RF waves received via antenna 451, and cause antenna 451 to transmit RF waves according to what it has processed.

Operational processing block 490 includes local processor 456 and/or remote processor 476. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
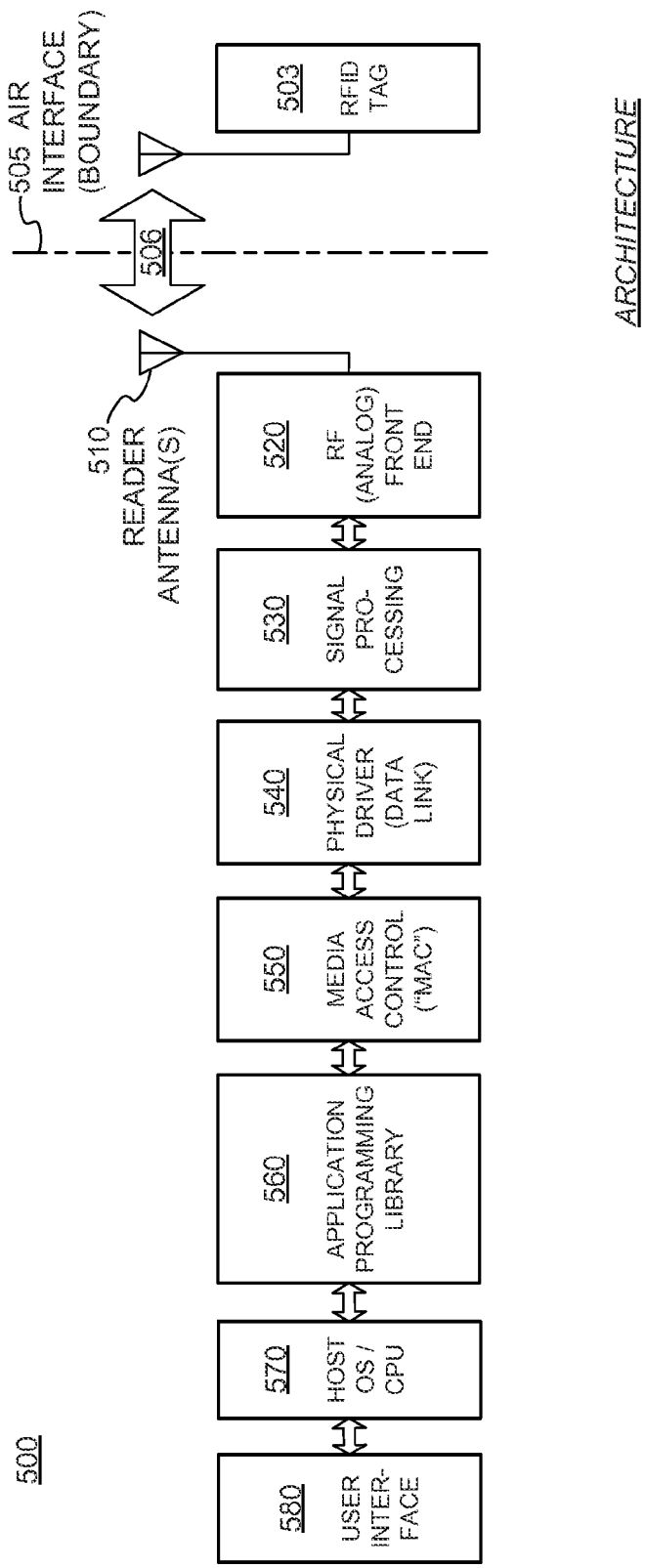
FIG. 5 is a block diagram illustrating an overall architecture of an RFID system according to embodiments.

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself RFID tag 503 conducts a wireless communication 506 with other modules or components, via an air interface 505. It is noteworthy that air interface 505 is really only a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges signals with RF front-end module 520, such as I and Q signal pairs.

RFID system 500 also includes a physical-driver module 540, which is also known as a data-link module. In some embodiments physical-driver module 540 exchanges data with signal-processing module 530. Physical-driver module 540 can be the stage associated with the framing of data.

RFID system 500 additionally includes a media access control module 550, which is also known as a MAC layer module. In one embodiment, MAC layer module 550 exchanges data with physical driver module 540. MAC layer module 550 can make decisions for sharing the wireless communication medium, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered a separate module, but rather as one that includes some of the above-mentioned modules of RFID system 500. In some embodiments the one or more processors perform operations associated with retrieving data that may include a tag public key, an electronic signature, a tag identifier, an item identifier, and a signing-authority public key. In some embodiments the one or more processors verify an electronic signature, create a tag challenge, and verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID signals and in the other direction for receiving RFID signals. In transmitting mode, signal initiation can be in any one of the modules. Ultimately, signals are routed to reader antenna(s) 510 to be transmitted as wireless RF signals. In receiving mode, reader antenna(s) 510 receives wireless RF signals, which are in turn processed successively by the various modules in the chain. Processing can terminate in any one of the modules.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of modules.

As mentioned previously, embodiments are directed to employing RFID readers for tag authentication using public-key cryptography. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments further include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. If the storage medium is a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6:
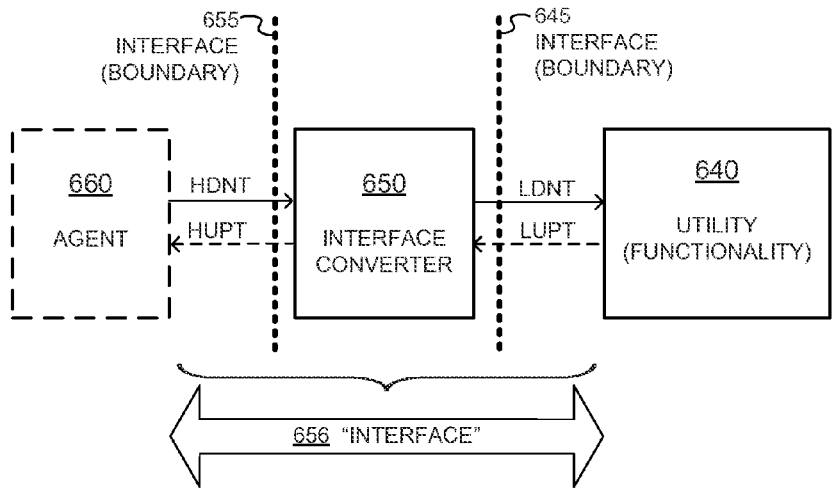
FIG. 6 is a block diagram illustrating an interface-converter architecture according to embodiments.

FIG. 6 is a block diagram illustrating an architecture 600 for an interface converter according to embodiments. Architecture 600 includes a utility 640, which is a mechanism for performing some or all of the reader features described above.

More particularly, utility 640 may cause a tag to store one or more received instructions in its memory, execute the instructions in response to a subsequent command or trigger event, and respond differently to a reader command based on results generated by executing the instructions.

Architecture 600 additionally includes an interface converter 650 and an agent 660. Embodiments also include methods of operation of interface converter 650. Interface converter 650 enables agent 660 to control utility 640. Interface converter 650 is so named because it performs a conversion or a change, as will be described in more detail below. Agent 660, interface converter 650, and utility 640 can be implemented in any way known in the art. For example, each can be implemented in hardware, middleware, firmware, software, or any combination thereof. In some embodiments, agent 660 is a human.

Between interface converter 650, agent 660 and utility 640 there are respective boundaries 655 and 645. Boundaries 655 and 645 are properly called interfaces, in that they are pure boundaries, similar to the above described air interface.

In addition, it is a sometimes informal usage to call the space between boundaries 655 and 645, which includes interface converter 650, an "interface" 656. Further, it is common to designate this space with a double arrow as shown, with an understanding that operations take place within the arrow. So, although "interface" 656 is located at a boundary between agent 660 and utility 640, it is not itself a pure boundary. Regardless, the usage of "interface" 656 is so common for interface converter 650 that this document sometimes also refers to it as an interface. It is clear that embodiments of such an "interface" 656 can be included in this invention, if they include an interface converter that converts or alters one type of transmission or data to another, as will be seen below.

Agent 660 can be one or more layers in an architecture. For example, agent 660 can be something that a programmer programs. In alternative embodiments, where agent 660 is a human, interface converter 650 can include a screen, a keyboard, or any other user interface.

Figure 7:
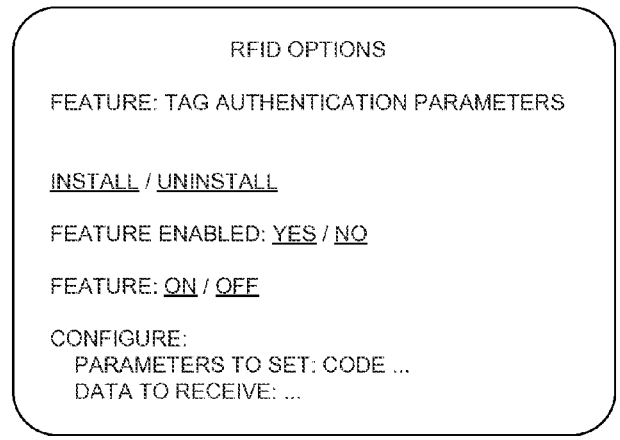
FIG. 7 is a sample screenshot of an interface converter such as the interface converter of FIG. 6, according to an embodiment.

FIG. 7 is a sample screenshot 750 associated with an interface for an interface converter, such as the interface converter 650 of FIG. 6. Screenshot 750 can be that of a computer screen for a human agent, according to an embodiment. What is displayed in screenshot 750 exposes the functionality of a utility, such as utility 640. Inputs by the user via a keyboard, a mouse, etc., can ultimately control utility 640. Accordingly, such inputs are received in the context of screenshot 750. These inputs are determined from what is needed for controlling and operating utility 640. An advantage with such interfacing is that agent 660 can prepare RFID applications at a higher level, without needing to know how to control lower level RFID operations. Such lower level RFID operations can be as described in the Gen2 Specification, in cryptographic algorithms, in other lower level protocols, etc. Utility 640 can be controlled in any number of ways. Some such ways are now described.

Returning to FIG. 6, one way interface converter 650 can be implemented is as a software Application Programming Interface (API). This API can, for example, control or provide inputs to an underlying software library.

Communications can be made between agent 660, interface converter 650, and utility 640. Such communications can be as input or can be converted, using appropriate protocols, etc. These communications can encode commands, data, etc., and can include any one or a combination of the following: a high-down communication HDNT from agent 660 to interface converter 650; a low-down communication LDNT from interface converter 650 to utility 640; a low-up communication LUPT from utility 640 to interface converter 650; and a high-up communication HUPT from interface converter 650 to agent 660. These communications can be spontaneous, or in response to another communication, or in response to an input or an interrupt, etc.

Commands are more usually included in communications HDNT and LDNT, for ultimately controlling utility 640. Controlling can be in a number of manners. One such manner can be to install utility 640, or just a feature of it. Such installing can be by spawning, downloading, etc. Other such manners can be to configure, enable, disable, or operate utility 640, or just a feature of it. These commands can be standalone, or can carry parameters, such as data, instructions to be stored by tags, etc. In some embodiments interface converter 650 can convert these commands to a format suitable for utility 640.

Data is more usually included in communications HUPT and LUPT. The data can inform as to success or failure of executing an operation. The data can also include tag data, which can be both codes read from tags and data about reading tags (such as time stamps, date stamps, etc.). In some embodiments interface converter 650 can convert the data to a format suitable for agent 660, including in some cases aggregating, filtering, merging, or otherwise altering the format or utility of the data.

It should be noted that what passes across a single pure boundary is unchanged (by the mere definition of a pure boundary). But what passes through interface converter 650 can be changed or not. More particularly, high-down communication HDNT can be encoded similarly to, or differently from, low-down communication LDNT. In addition, low-up communication LUPT can be encoded similarly to, or differently from, high-up communication HUPT. When encodings are different, the difference can be attributed to interface converter 650, which performs a suitable change, or conversion, of one communication to another. The change, or conversion, performed by interface converter 650 is for exposing the functionality of utility 640 to agent 660, and vice versa. In some embodiments, a command is converted, but a parameter is passed along without being converted. What is not converted at one module may be converted at another. Such modules taken together can also form an interface converter according to embodiments.

Figure 8:
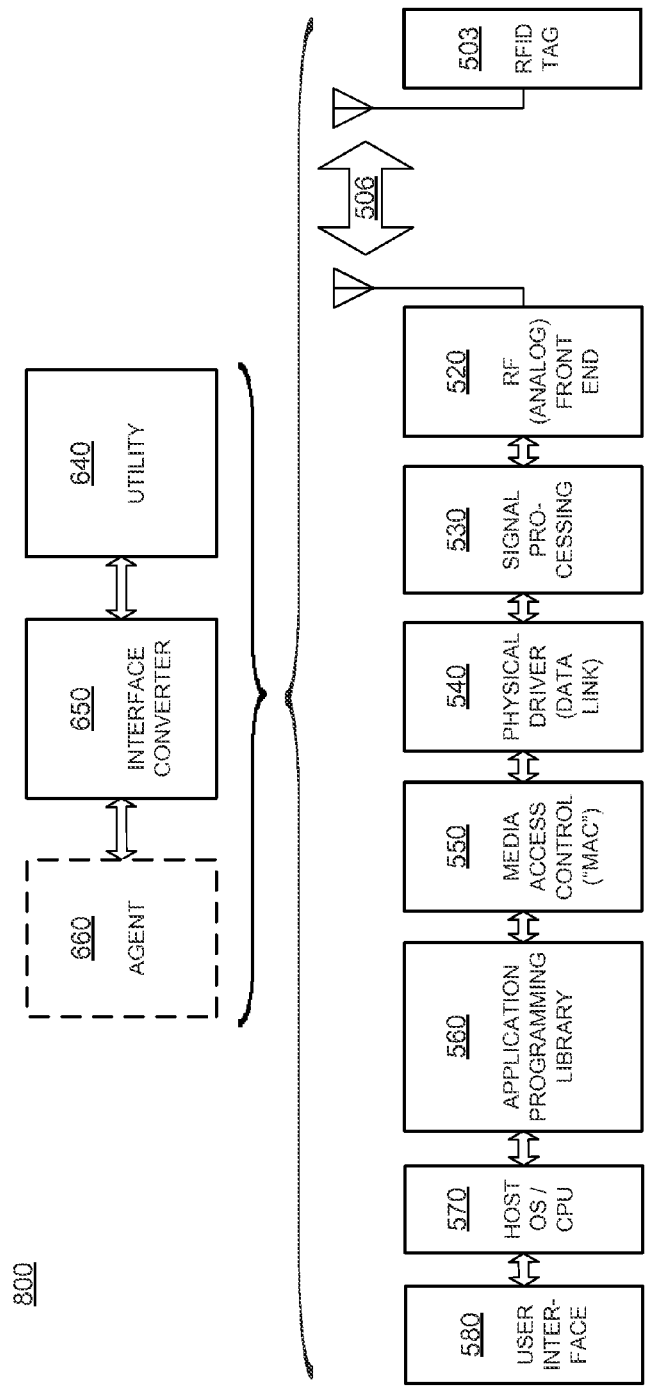
FIG. 8 is a diagram for showing a correspondence for how components of FIG. 6 can be implemented by those of FIG. 5, in embodiments where the interface converter is implemented by a reader.

Agent 660, interface converter 650, and utility 640 can be implemented as part of a reader, or as a different device. When implemented as part of a reader, FIG. 8 suggests a scheme 800 where agent 660, interface converter 650, and utility 640 can be implemented in connection with respective reader modules that are suitable, depending on the requirements.

Figures 9A, 9B:
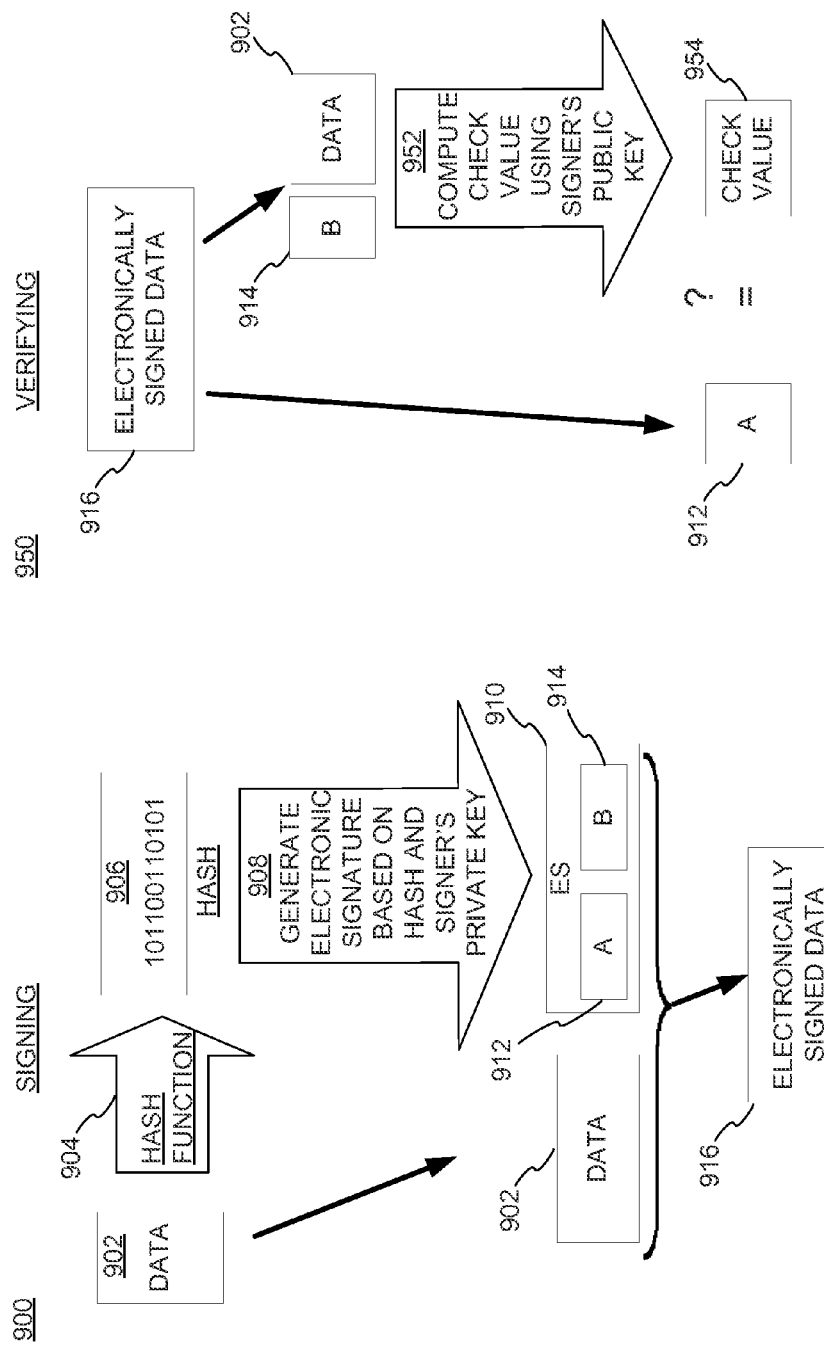
FIG. 9A is a flow diagram illustrating electronically signing data.
FIG. 9B is a flow diagram illustrating verifying electronically signed data.

FIGS. 9A and 9B are flow diagrams illustrating the creation and verification of an electronic signature (ES). Electronic signatures allow verification of the authenticity and integrity of an electronic message, including whether the message originated from a claimed sender and/or whether the message is original or has been altered.

Electronic signatures often employ asymmetric cryptography, in which case they are known as digital signatures. In asymmetric cryptography, a signatory, also referred to as a sender, possesses a private-public key pair where the private and public keys are mathematically related to each other. The sender uses the private key to generate the ES. A recipient uses the sender's public key to verify the ES. A verified ES provides the recipient with some confidence that the message was created by a known sender and that it was not altered in transit.

An important attribute of digital signatures is that they are difficult to forge. A number of standards have been developed for digital signatures. The Digital Signature Standard (DSS) is a U.S. government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, the Secure Hash Standard (SHS), specifies the hash functions to be used in conjunction with FIPS 186-1 and FIPS 186-3. The DSS, FIPS 186-1, FIPS 186-3, and FIPS 180-3 are hereby incorporated by reference in their entireties.

FIG. 9A is a flow diagram illustrating a method 900 for generating an ES. In method 900, a hash function 904 is first applied to data 902 to generate a hash value 906. An ES 910 is then generated (908) using the hash value 906 and the signer's private key (604). For example, the ES generation process may involve an ECDSA process, in which private and public ephemeral keys are computed and used to generate the ES 910. The ES 910 may include two signature components 912 and 914. In some embodiments, the two signature components 912 and 914 may correspond to r and s components of an ECDSA-generated ES. Subsequently, the ES 910 may be concatenated with the data 902 to create electronically-signed data 916.

FIG. 9B is a flow diagram illustrating a method 950 for verifying an ES, such as the ES 910 generated in FIG. 9A. In the method 950, data 902 and signature component 914 in the electronically-signed data 916 are used to compute (952) a check value 954 using the signer's public key. For example, the hash function 904 may be applied to the extracted data 902 to generate a hash value, which is then used along with the signer's public key and the signature component 914 to compute the check value 954. Subsequently, the computed check value 954 is compared to the signature component 912 in the electronically-signed data 916. If the values match, then the ES is considered verified or proper. A verified ES provides assurance that the data 902 was signed by the known sender and that the data has not been altered. On the other hand, if the values do not match, then the electronically-signed data 916 may have been tampered with and/or altered.

While electronic signatures above are described in the context of asymmetric cryptography, in some embodiments electronic signatures may instead employ symmetric cryptography, in which case they may be known as "message authentication codes" or MACs. When using symmetric cryptography, a signer may use a secret key to generate a MAC based on data (e.g., data 902) and/or a hash value derived from the data (e.g., hash value 906). The MAC and the data together may then constitute electronically-signed data (e.g., electronically-signed data 916). A recipient of the electronically-signed data who also knows the secret key may then either (a) use the MAC to generate check data and compare the check data with the original data or (b) use the original data to generate a check MAC and compare the check MAC with the original MAC. Based on the comparison, the recipient can determine if the data originated from an entity in possession of the secret key and/or was tampered with during transit.

Figure 10:
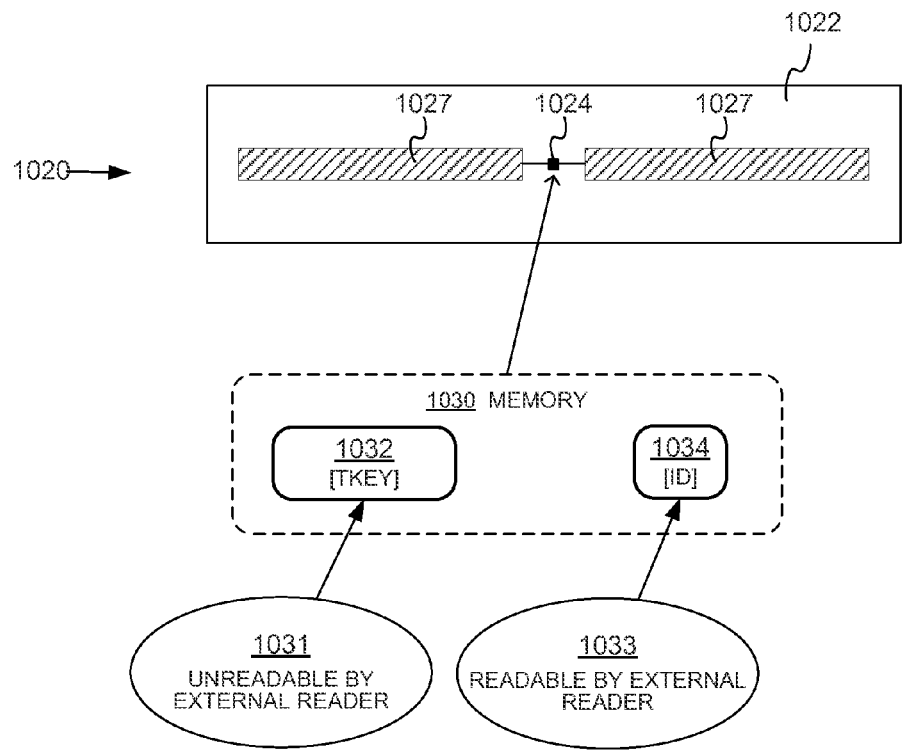
FIG. 10 illustrates an RFID tag and how an identifier and a key may be stored in the tag according to embodiments.

FIG. 10 illustrates a tag 1020 configured to store a tag key 1032 and an identifier (ID) 1034 according to embodiments. Tag 1020, similar to tag 220 depicted in FIG. 2, includes an IC 1024 (similar to IC 224 in FIG. 2) with a tag memory 1030 configured to store the tag key 1032 and the ID 1034. The tag key TKEY 1032, which is used to encrypt or decrypt messages sent from or received by the tag 1020, is stored in a portion 1031 of the tag memory 1030 that is not readable by an external device such as a reader. TKEY 1032 may be a private key (for asymmetric cryptography) or a secret key (for symmetric cryptography).

In contrast, the ID 1034, which may identify the tag, an item to which the tag is attached, or both, is stored in a portion 1033 of the tag memory 1030 that is readable by an external device. For example, the ID 1034 may include a tag identifier (TID), a key identifier (KID), a unique item identifier (UII), an electronic product code (EPC), a serialized trade identification number (SGTIN), or any other suitable identifier or identification code. The tag memory 1030 may also be configured to store any other suitable data.

Figure 11:
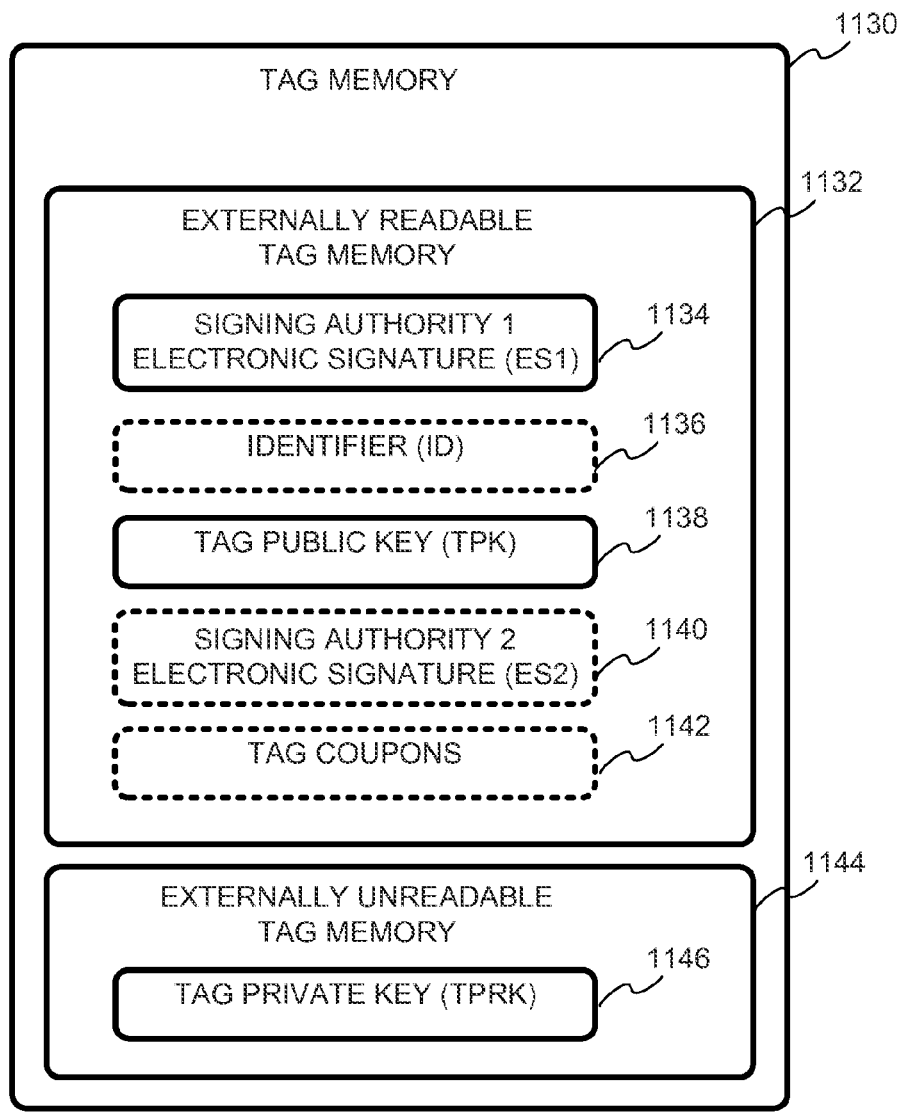
FIG. 11 illustrates a tag IC memory configuration according to one embodiment.

FIG. 11 illustrates a tag memory configuration 1100 of a tag memory 1130 according to embodiments. The tag memory 1130, which like tag memory 1030 above may be part of a tag integrated circuit (IC), includes a memory portion 1132 that is readable by an external device (e.g., a reader) and a memory portion 1144 that is not readable by an external device. Various types of data may be stored in the memory portions 1132 and 1144, depending on the nature of the data. For example, a tag manufacturer or other legitimate entity may generate a tag key pair having a tag private key (TPRK) 1146 and a tag public key (TPK) 1138 and store these keys in tag memory. The TPRK 1146, which is only known to the tag, is stored in the unreadable memory portion 1144. The TPK 1138, which is publicly accessible, may be stored in the readable memory portion 1132. An external party can then use the publicly accessible TPK 1138 to encrypt or sign a message to the tag, which can then use its TPRK 1146 to decrypt or verify the message. Similarly, the tag can use its TPRK 1146 to encrypt or sign a message to an external party, which then uses the publicly accessible TPK 1138 to decrypt or verify the message.

In some embodiments, the externally-readable memory portion 1132 includes an optional identifier (ID) 1136, similar to ID 1034. The ID 1136 identifies the tag and/or an item to which the tag is attached, and may include a tag identifier (TID), an item identifier such as an EPC code (EPC) or a unique item identifier (UII), or some other number such as a serialized global trade identification number (SGTIN).

The externally-readable memory portion 1132 also includes a signing authority electronic signature (ES1) 1134. A signing authority (e.g., the tag manufacturer, the item manufacturer, or a trusted third party) may generate the ES1 1134 using a signing authority private key and use the ES1 1134 to electronically sign the TPK 1138 and/or the ID 1136, as described above in relation to FIGS. 9A-B. The ES1 1134, in combination with a signing authority public key, can then be used to verify the authenticity of the TPK 1138 and/or the ID 1136. In some embodiments, the memory portion 1132 also includes another ES2 1140, which may be generated using the private key of a different signing authority. ES1 1134 and ES2 1140 may both sign the same data (e.g., both sign the TPK 1138 and/or the ID 1136), each sign a different piece of data (e.g., ES1 1134 signs the TPK 1138 and ES2 1140 signs the ID 1136, or vice-versa), or may overlap in their signatures (e.g., ES1 1134 signs the TPK 1138 and ES2 1140 signs both the TPK 1138 and the ID 1136). One advantage of having electronic signatures from different signing authorities is that a particular reader only needs to have access to one of the signing entity public keys in order to authenticate the signed data. In certain embodiments, an ES signs another ES. For example, if ES1 1134 signs the TPK 1138 and/or the ID 1136, ES2 1140 may then sign the ES1 1134 and the TPK 1138/ID 1136.

The tag memory 1130 may also store one or more optional tag coupons 1142 (also known as commitments). A tag coupon (or commitment) represents a pre-computed cryptographic value, and may either be the actual cryptographic value, an indicator that corresponds to but is not the actual cryptographic value, or be derived using the cryptographic value as a coupon precursor. Because a tag coupon represents a pre-computed value, it can be used to facilitate an asymmetric cryptographic transaction between the tag and another entity (e.g., a reader) by reducing the computation performed by the tag. For security reasons, a particular tag coupon is typically discarded after a single cryptographic transaction. Therefore, a coupon-enabled tag that is configured for multiple transactions may store (or have access to) a number of tag coupons, each of which is unique for at least the tag. In some embodiments, tag coupons 1142 are stored in the readable memory portion 1132. During a transaction, the other party (e.g., a reader) reads a selected tag coupon from the coupons 1142 stored in the memory portion 1132. In other embodiments, tag coupons are stored in the unreadable memory portion 1144, and when a coupon is required for a transaction, the tag retrieves a selected tag coupon 1142 from the memory portion 1144 and stores it in the readable memory portion 1132 for the other party to read.

In some embodiments, a tag may use a counter value in a tag coupon counter to keep track of its tag coupons. The tag may use the counter value to determine which tag coupons have been used, or may also generate tag coupons based on the counter value using, for example, a pseudorandom number generator seeded based on a tag coupon counter value. The tag then either stores the generated tag coupon or the tag coupon counter value in the readable memory portion 1132 for the other party to read. In the latter case, the other party then is able to generate the tag coupon using the tag coupon counter value.

After data is stored on the tag IC memory portions 1132 and 1144, the memory portions 1132 and 1144 may be configured so as to be unwriteable by external devices. This can be done to prevent a counterfeiter or attacker from rewriting sensitive data (e.g., TPK, TPRK, electronic signatures, coupons, etc.) onto the tag IC memory. However, in some circumstances it is possible for an external device to erase and/or rewrite data on memory portions 1132 and 1144. For example, a tag manufacturer may wish to re-commission (see FIG. 12, below) a particular tag by providing new keys and/or coupons in order to reuse the tag or if it is determined that the tag has been compromised.

Counterfeiters can clone tag ICs that do not have a hidden key or other hidden secret by simply copying the tag IC memory contents. Counterfeiters cannot easily clone tags IC built according to embodiments because the ICs contain an unreadable TPRK and use coupons and challenge-response methods for authentication.

Embodiments also provide a means for a reader to authenticate a tag without needing to know a unique password or key for each tag. The tag exposes its TPK, protected by an ES, to the reader. The reader uses the signing authority's public key and the ES to verify the TPK. The reader then uses the verified TPK and a challenge-response dialog to authenticate the tag, as described below.

Embodiments can be used for items and applications requiring counterfeit detection, where genuine items have authentic tags but non-genuine items do not have authentic tags and can be discovered, traced, and removed. Embodiments render counterfeiting or cloning a tag difficult by providing each authentic tag with a (ideally) unique private-public key pair and allowing a reader to verify the tag's authenticity without needing to store a unique public key for every tag and without needing to access a network every time it wants to verify a tag. Example applications include retail, food safety, pharmaceutical, document protection, and the currency industries.

Figure 12:
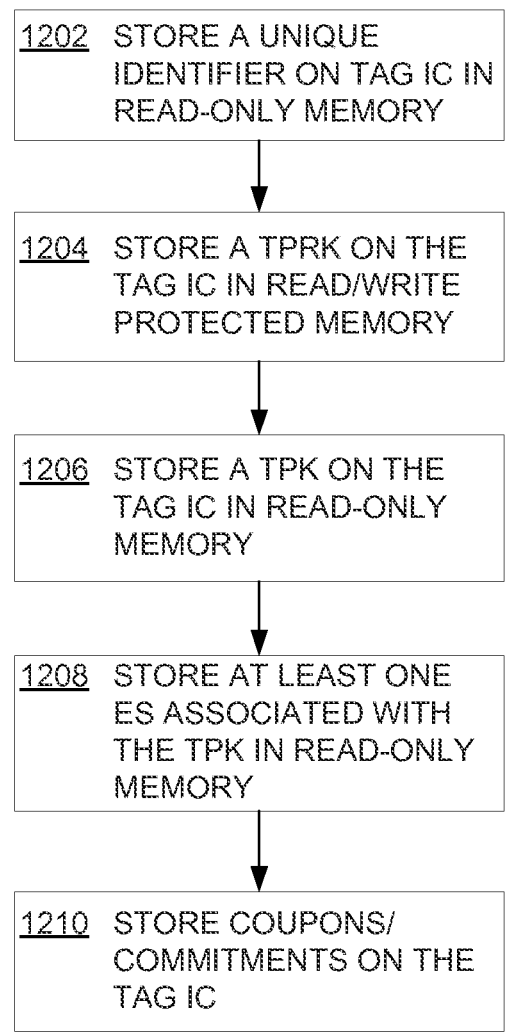
FIG. 12 is a flowchart illustrating an RFID tag IC commissioning process according to an embodiment.

An RFID tag IC may be commissioned before it is deployed. FIG. 12 is a flowchart illustrating an RFID tag IC commissioning process 1200 according to an embodiment. The commissioning process 1200 begins with step 1202, in which a unique identifier (e.g., ID 1136 in FIG. 11) is stored on the tag IC in read-only memory (e.g., memory portion 1132 in FIG. 11). In step 1204, a tag private key (e.g., TPRK 1146 in FIG. 11) is stored in read/write-protected memory (e.g., memory portion 1144 in FIG. 11), and in step 1206 a corresponding tag public key (e.g., TPK 1138 in FIG. 11) is stored in read-only memory (e.g., memory portion 1132 in FIG. 11). In step 1208, an electronic signature (e.g., ES1 1134) associated with the stored tag public key is then generated and stored in read-only memory such as memory portion 1132 in FIG. 11. In some embodiments, one or more other electronic signatures (e.g., ES2 1140 in FIG. 11) associated with the stored tag public key, an identifier, and/or one or more other electronic signatures may also be generated and stored in tag memory. Finally, in step 1210, one or more tag coupons are stored on the tag IC. Tag coupons may be stored in externally-readable memory, such as memory portion 1132 in FIG. 11, or may be stored in externally-unreadable memory, such as memory portion 1144 in FIG. 11. However, if tag coupons are generated by the tag as described above in relation to FIG. 11, the tag coupons may not be stored on the tag during the commissioning process.

In some embodiments, multiple electronic signatures can be combined into a single electronic signature block. During the combination process, redundant signature components can be removed, resulting in the final signature block occupying less memory than all of the individual electronic signatures.

Figure 13:
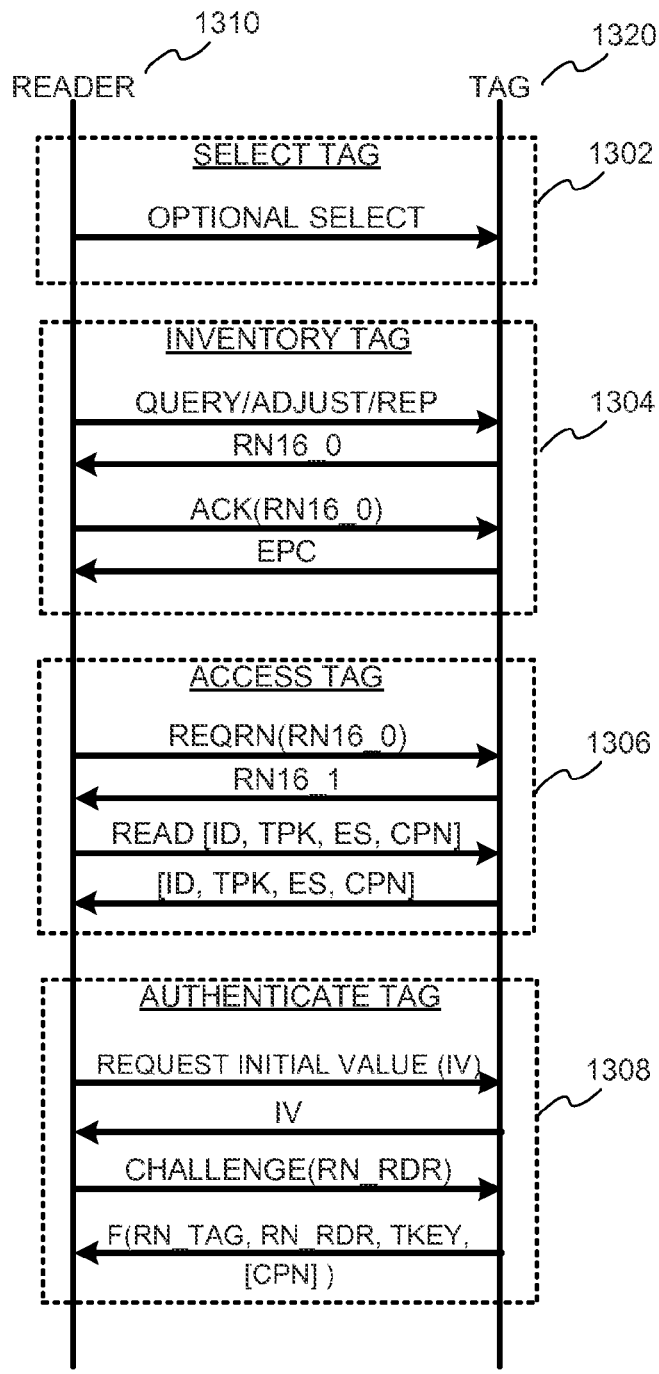
FIG. 13 illustrates exchanges between a reader and a tag according to embodiments.

FIG. 13 illustrates command-response exchanges between a reader and a tag according to embodiments. Although the commands and responses in diagram 1300 of FIG. 13 assume that the reader and tag are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 13. Other orderings are possible; exchanges can be merged, enhanced, or eliminated; and the authentication can be spread across various operations between reader and tag.

The interactions between reader 1310 and tag 1320 in diagram 1300 begin with an optional tag selection 1302, in which the reader sends a select command to multiple tags in a tag population in order to select one or more tags from the tag population for subsequent inventory and authentication. This optional selection is followed by an inventory 1304, where the reader singulates a tag and receives an identifier from the tag. The shown inventory uses the Query-ACK sequence described in the Gen2 Specification. Inventory is followed by access 1306, where the reader accesses the tag and optionally reads the tag's TPK, ID, ES, and a selected tag coupon (or a random number based on the selected tag coupon). Finally, access is followed by authentication 1308, where the reader authenticates the tag using a challenge-response dialog as described herein.

As described above, embodiments include different orderings of interactions between reader and tag. For example, in some embodiments the reader sends a challenge during tag selection 1302, preceding the access 1306, and the tag computes its response and stores the response in memory for subsequent reading by a reader. The tag's computation may also include a tag random number and/or a tag coupon, and this random number/tag coupon may be stored for subsequent access by the reader. Indeed, in embodiments where the challenge occurs during tag selection, and reading the response occurs during tag access, authentication 1308 need not exist, because its operations have been spread among select 1302 and access 1306. One reason a reader may choose to send the challenge with select 1302 is for multiple tags to hear the challenge and compute their cryptographic responses in parallel. Because cryptographic computations can be time intensive, enabling multiple tags to compute their responses in parallel allows more rapid authentication of a population of tags. In some embodiments, the challenge itself may be sent to multiple tags simultaneously, separately from select 1302.

Authentication 1308 can include many options, depending on the chosen cryptographic algorithm. For example, the reader may first request a tag random number from the tag. The tag may generate a tag random number, calculate an initial value (IV) from the tag random number and a tag key TKEY (which may be a secret key or a private key), and sends the IV to the reader. The reader then sends a challenge including a reader-generated random number to the tag. The tag computes its response to the challenge based on the TKEY, the tag random number, the reader challenge, and a selected tag coupon, and sends the response to the reader. At this point the reader can verify the tag's response using the IV, the reader random number, the coupon, and the TPK. Of course, some challenge-response variants do not use a tag random number, an IV, or tag coupon; others may include a command count or a message-authentication code; others may include the reader encrypting the random number in the reader challenge; and yet others may include fewer or more steps than shown.

In some embodiments a reader retrieves a tag's TPK, ES, and coupon, obtains the signing authority's master public key via a network or other means, verifies the TPK, challenges the tag with a random number, receives the tag's response, and verifies the response using the TPK and the coupon. In some embodiments the reader also receives an ID from the tag, and may use the ID to identify a signing authority or a particular master key. In some embodiments the challenge includes the reader encrypting a random number (RN) using the TPK, sending the encrypted RN to the tag, receive a decrypted RN from tag, and verifying by comparing the RN before encryption with the received, decrypted RN. In other embodiments the challenge includes the reader sending an RN to the tag, receiving an encrypted RN from tag, decrypting the received RN using the TPK, and verifying by comparing the sent RN with the decrypted, received RN. In yet other embodiments, the reader may send a tag response to a challenge to a network-connected verification authority for verification, without needing to use the tag TPK or coupon.

Figure 14:
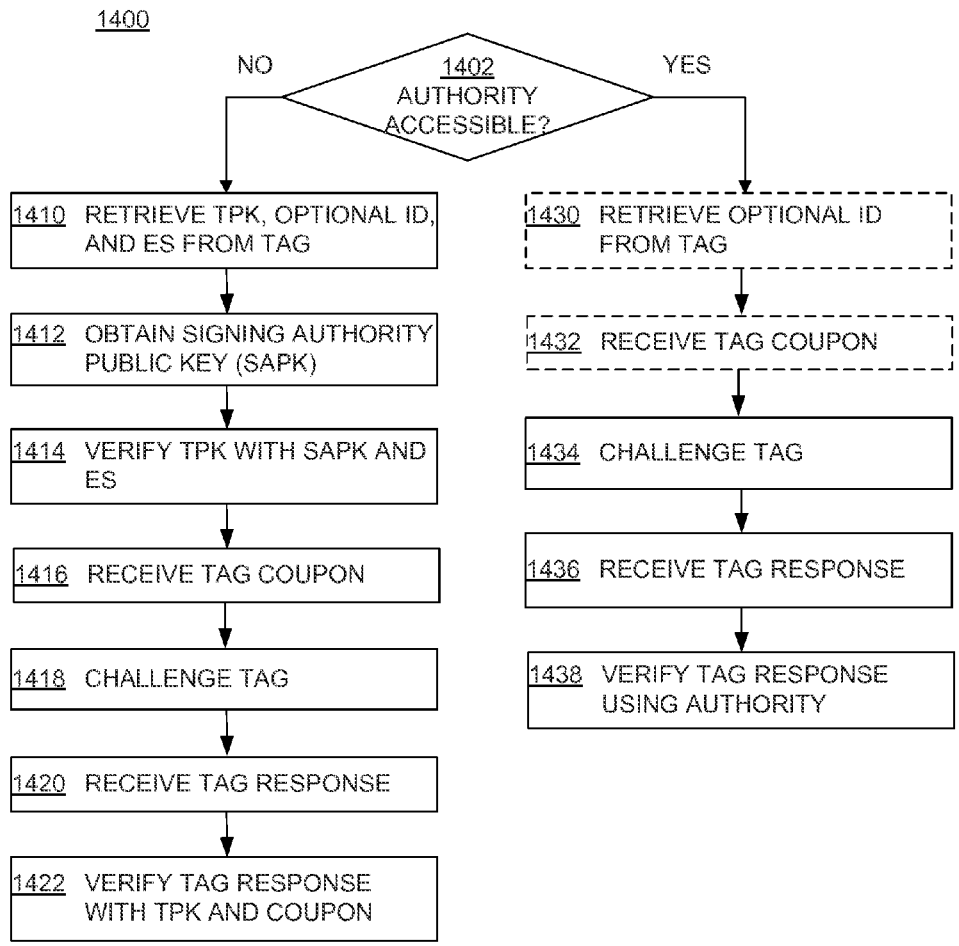
FIG. 14 is a flowchart illustrating a process for a reader authenticating a tag according to embodiments.

FIG. 14 is a flowchart illustrating a process 1400 for a reader authenticating a tag according to embodiments. Process 1400 begins with operation 1402, where the reader determines if it can access a verification authority through a network connection. If not, the reader retrieves at least a TPK and an ES from a tag in operation 1410. Optionally, the reader also retrieves an ID which may be a tag identifier, an item identifier, or both. At operation 1412 the reader obtains a signing-authority public key (SAPK), also known as a master public key, from a signing authority. In some embodiments the reader may use the retrieved ID to help identify the proper signing authority, or to help identify which SAPK to use from a given signing authority. In some embodiments the reader retrieves the SAPK indirectly, via a $3^{rd}$ party. In other embodiments, the SAPK is stored at the reader, and the reader accesses the stored SAPK instead of having to retrieve it from the signing authority. The reader verifies the TPK using the SAPK and ES at operation 1414. At operation 1416, the reader receives a tag coupon from the tag. For example, the tag may send the actual tag coupon to the reader, or may instead send a number associated with or generated from the coupon (e.g., a tag coupon counter value). At operation 1418 the reader challenges the tag. In some embodiments, the reader challenges the tag by sending a Challenge or Authenticate command, both of which are described in the Gen2 Specification. According to some embodiments the reader challenge includes a random number. At operation 1420 the reader receives a tag response to the challenge. At operation 1422 the reader verifies the tag response using the TPK and the tag coupon. If the verification is successful then the tag is presumed genuine.

On the other hand, if at operation 1402 the reader determines that a verification authority is accessible, the reader may proceed to verify the tag without using the TPK or any tag coupons. The reader may first retrieve a tag ID at optional operation 1430, similar to operation 1410, and may also receive a tag coupon at optional operation 1432, similar to operation 1416. The reader then challenges the tag at operation 1434 and receives a tag response at operation 1436, similar to operations 1418 and 1420 above. In some embodiments, the reader may notify the tag, or the tag itself may determine, that the tag response should not be computed using a tag coupon. Finally, at operation 1438 the reader may use the accessible verification authority to verify the received tag response, instead of verifying the tag response using a tag TPK and coupon.

In some embodiments, the operations in process 1400 may be combined, or may take place in different orders. For example, the reader may receive the tag coupon along with the TPK, optional ID, and/or ES. As another example, the reader may send the tag challenge before operations 1410, 1412, 1414, 1416, 1430, and/or 1432. As yet another example, the SAPK retrieval in operation 1412 may occur before operation 1410 or after the tag coupon and/or the tag response is received, and the TPK verification in operation 1414 may occur after the tag coupon and/or the tag response is received.

Figure 15:
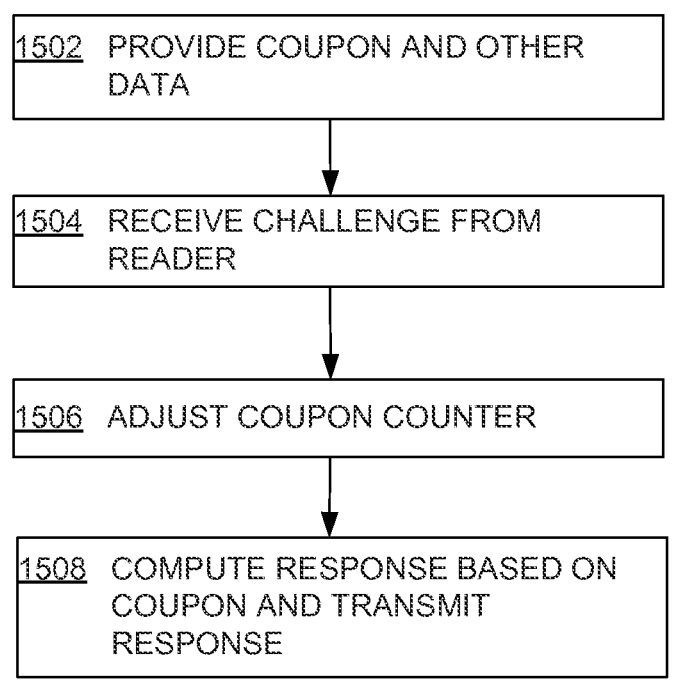
FIG. 15 is a flowchart illustrating a tag coupon-based response process according to embodiments.

For coupon-based authentication schemes, it is preferable to assure that a particular selected coupon on a tag is only used once. One method to accomplish this is to associate each coupon on a tag with a particular value of a tag coupon counter, and then to increment or decrement the counter as each coupon is used. FIG. 15 is a flowchart illustrating a tag coupon-based response process 1500 according to embodiments. Process 1500 begins with operation 1502, in which an RFID tag first provides a selected coupon and optionally other data. In some embodiments, the coupon is selected based on the value of the tag coupon counter. Operation 1502 may correspond with operations 1416 or 1432 in FIG. 14, where a reader receives the selected coupon from the tag. As described above, the RFID tag may also provide other data such as its TPK, identifier, and/or ES along with a selected coupon. The RFID tag subsequently receives a challenge from the reader in operation 1504. As described above, in some embodiments the challenge includes a Challenge or an Authenticate command as described in the Gen2 Specification. Upon receiving the challenge and determining that the coupon provided in operation 1502 is to be used in computing its response, the tag may then adjust the tag coupon counter in operation 1506 to indicate that the selected coupon (associated with the old counter value) has been used. The tag may adjust the tag coupon counter by incrementing or decrementing the tag coupon counter value. Finally, in operation 1508, the tag computes a response based on the selected coupon and the received challenge and sends the response to the reader. In other embodiments, the tag may adjust the tag coupon counter after the response has been computed or sent to the reader.

Figure 16:
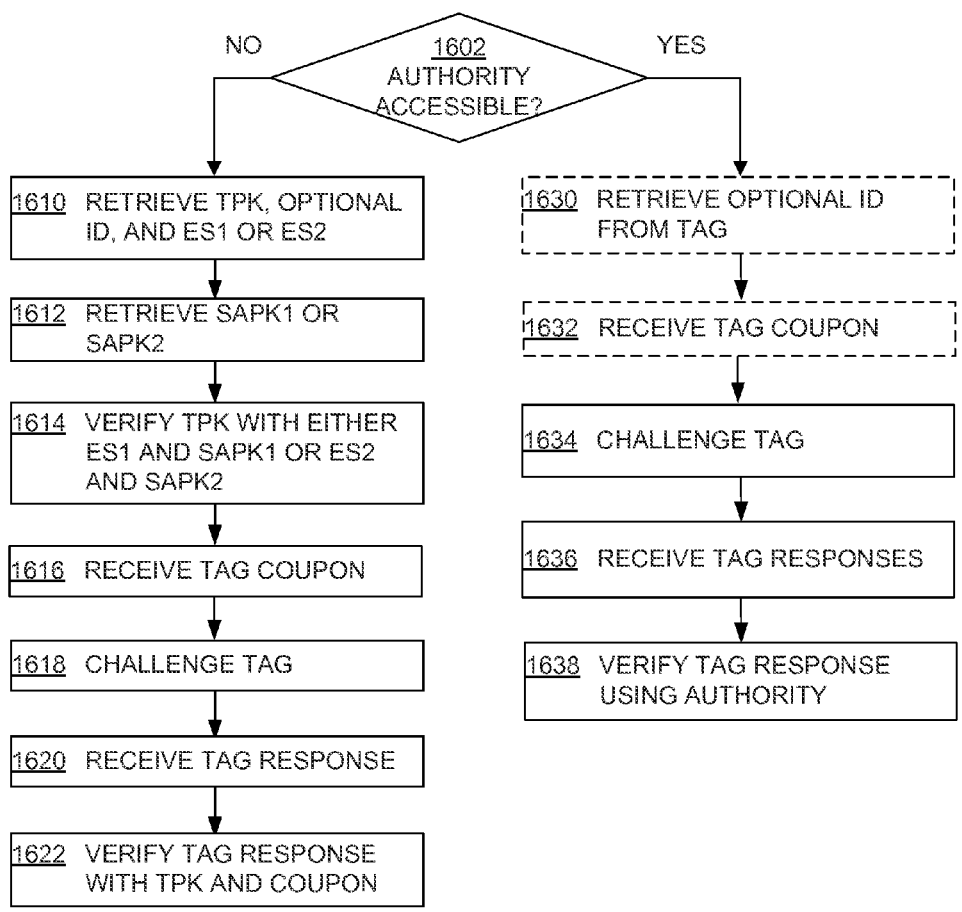
FIG. 16 is a flowchart illustrating a process for a reader authenticating a tag according to other embodiments.

FIG. 16 is a flowchart illustrating a process 1600 for a reader authenticating a tag according to embodiments. Process 1600 begins with operation 1602, where the reader determines if a verification authority it accessible via, for example, a network connection. If not, in operation 1610 the reader retrieves at least a TPK and an ES from a tag. In the embodiment shown the tag contains an ES1 and an ES2, corresponding to a first signing authority and a second signing authority, and the reader retrieves one of ES1 and ES2. Optionally, the reader may retrieve both ES1 and ES2, and may also retrieve one or more of a tag identifier, item identifier, or another type of identifier. At operation 1612 the reader retrieves, from a signing authority (i.e. the first signing authority and/or the second signing authority), a SAPK that corresponds to the retrieved ES. In some embodiments the reader may use the ID to help identify the proper signing authority, or may use the ID to help identify which SAPK to use from a given signing authority. The reader may also store the SAPKs locally, as described above in relation to FIG. 14, instead of having to retrieve the SAPKs from the signing authorities. In operation 1614 the reader verifies the TPK using the appropriate SAPK and ES. At operation 1616 the reader may receive a tag coupon from the tag, similar to operation 1416 described above. At operation 1618 the reader challenges the tag. In some embodiments, the reader challenges the tag by sending a Challenge or Authenticate command, both of which are described in the Gen2 Specification. According to some embodiments the reader challenge includes a random number. At operation 1620 the reader receives a tag response to the challenge. At operation 1622 the reader verifies the tag response using the TPK and the tag coupon. If the verification is successful then the tag is presumed genuine.

On the other hand, if at operation 1602 the reader determines that a verification authority is accessible, the reader may proceed to verify the tag without using the TPK or any tag coupons. The reader may first retrieve a tag ID at optional operation 1630, similar to operation 1610, and may also receive a tag coupon at optional operation 1632, similar to operation 1616. The reader then challenges the tag at operation 1634 and receives a tag response at operation 1636, similar to operations 1618 and 1620. In some embodiments, the reader may notify the tag, or the tag itself may determine, that the tag response should not be computed using a tag coupon. Finally, at operation 1638 the reader may use the accessible verification authority to verify the received tag response, instead of verifying the tag response using a tag TPK and coupon.

As mentioned above, the reader may interact with a verification authority that has some knowledge of the interrogated tag(s) (e.g., the tag key TKEY for one or more tags and/or the encryption algorithm(s) used by one or more tags). The verification authority may be known to the reader a priori, or the reader may query a network for the identity of an appropriate verification authority. In some embodiments, a tag may store the identity of a verification authority suitable for verification, and the reader may read the verification authority information from the tag. For example, referring to FIG. 13, after the reader has received a tag response in the authentication step 1308, the reader may send the tag response, the tag IV (if any), the original reader challenge, and the tag ID (received in access 1306) to the verification authority. The verification authority may then determine the tag key TKEY and/or the particular encryption algorithm used by that tag (e.g., by looking it up based on the received tag ID) and use the determined TKEY/encryption algorithm, along with the original reader challenge and tag IV (if any), to decrypt or verify the tag response. If the verification authority is able to decrypt/verify the tag response based on its knowledge of the tag (e.g., TKEY/encryption algorithm), then the verification authority confirms the tag response and thereby corroborates the tag's (or attached item's) authenticity.

In some embodiments, the verification authority may generate the challenge and send it to the reader for transmission to the tag. In this case, the reader may not transmit the original reader challenge back to the verification authority along with the tag response, tag IV, and the tag ID, because the verification authority already knows the challenge used. Optionally, the verification authority may generate and provide a random number (e.g., the reader random number or an entirely different random number) for the reader to use to generate the challenge.

Figure 17:
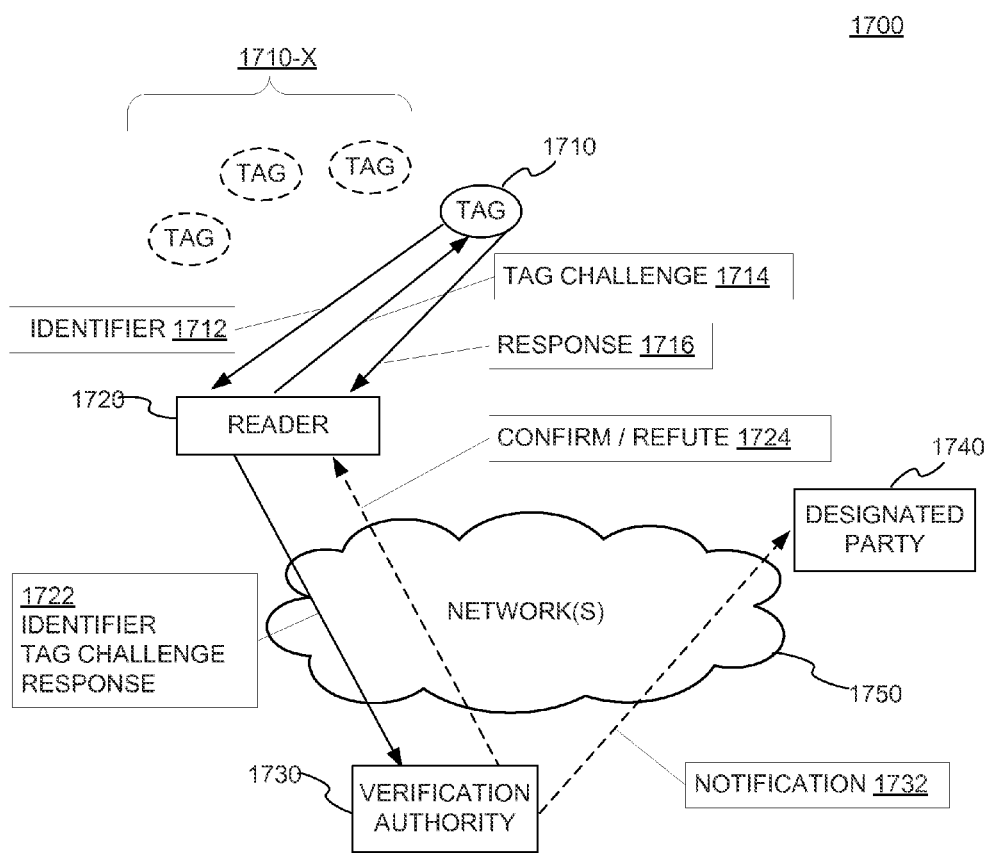
FIG. 17 is a diagram depicting interactions between an RFID reader, RFID tags, a verification authority, and a designated party according to embodiments.

FIG. 17 is a diagram 1700 depicting interactions between an RFID reader 1720, RFID tags 1710-X and 1710, a verification authority 1730, and a designated party 1740 according to one embodiment. In diagram 1700, reader 1720 is in the process of communicating with a number of tags 1710-X and 1710. In particular, reader 1720 has singulated tag 1710, and receives an identifier 1712 (e.g., an EPC or other identifier such as ID 1034/1136 in FIGS. 10/11) from the tag 1710, for example in response to an initial command. The reader 1720 then transmits a tag challenge 1714 (e.g., the challenge in authentication step 1308, FIG. 13) to the tag 1710. The tag 1710, which stores a secret (e.g., a tag key, such as TKEY 1032 or TPRK 1146 in FIGS. 10/11), generates a response 1716 (e.g., the F( ) response in authentication step 1308, FIG. 13) based on the stored secret and the tag challenge 1714 (and optionally tag-generated randomness). The tag 1710 then transmits the tag response 1716 to the reader 1720.

The reader 1720 then transmits (1722) the identifier 1712, the tag challenge 1714, the response 1716, and optionally any indicators of tag-generated randomness (e.g., a tag IV) to a verification authority 1730 over one or more networks 1750. The verification authority 1730 stores or has access to information about the tag 1710, such as its secret and/or the encryption algorithm it uses. The verification authority 1730 then uses this information, the received identifier 1712, tag challenge 1714, and response 1716 to determine if the tag is authentic. For example, in one embodiment, the verification authority 1730 may use the received identifier to find and access a local copy of the tag's stored secret/key, compute a response from the secret/key and the received tag challenge, and compare the computed response with the actual, received tag response. If the two responses match, the tag is authentic, and if the responses do not match, the tag is not authentic. The verification authority 1730 may then optionally send a message 1724 to the reader 1720 via network(s) 1750 confirming or refuting the authenticity of the tag (or an item it is attached to).

In some embodiments, the message 1722 transmitted by the reader 1720 to the verification authority 1730 may include the physical location of reader 1720 when the challenge was issued to the tag 1710. The message 1722 may also include a reader identifier, and/or may be signed with an electronic signature. In some embodiments, the verification authority 1730 may require that reader 1720 authenticate itself before performing the tag authentication. For example, the verification authority 1730 may challenge the reader 1720, or may verify the identity of reader 1720 based on an electronic signature signing the message 1722.

The verification authority 1730 may also transmit a notification 1732 to one or more designated parties 1740 via network(s) 1750 indicating whether the authenticity of tag 1710 was confirmed or refuted. For example, a pharmaceutical distributor using an RFID-enabled handheld reader to interrogate a shipment (such as a case of medicine) may utilize a verification authority, which may send the reply to a designated party such as the distributor's security office or, in some instances, directly to the police in the event of counterfeit medicine. In some embodiments, the verification authority 1730 may electronically sign the notification 1732 to the designated party 1740.

In some embodiments, the verification authority 1730 may transmit a message to the reader 1720 if the authenticity of the tag 1710 is confirmed or refuted. In other embodiments, the verification authority 1730 may only transmit a message if tag authenticity is confirmed, if it is refuted, or may not transmit a message to the reader 1720 at all. The verification authority 1730 may also transmit a notification to designated parties) 1740 if the authenticity of the tag 1710 is confirmed or refuted, only if tag authenticity is confirmed, or only if tag authenticity is refuted.

In some embodiments message 1724 and notification 1732 may be electronically signed by the verification authority 1730. For example, the verification authority may compute an electronic signature based on the message/notification to be transmitted, a key or secret associated with the verification authority, and a cryptographic algorithm, and attach the computed electronic signature to the message/notification. When an entity (e.g., reader 1720 or designated party 1740) receives the message/notification, it may use the electronic signature to validate the message/notification by determining (a) if the message/notification actually came from the verification authority, and (b) if the message/notification was altered during transmission from the verification authority. In one embodiment, the receiving entity may perform these determinations using a public key (related to the private key/secret used by the verification authority to compute the electronic signature).

As shown in diagram 1700, the verification authority 1730 communicates with the reader 1720 and the designated party 1740 over one or more networks 1750. The network(s) 1750 may be available in real-time, meaning that the reader 1720 can engage with the verification authority 1730 on a message-by-message basis, or the network(s) 1750 may be non-real-time, meaning that the reader 1720 stores or buffers its messages and transmits them to the verification authority 1730 when the network is available. Of course, the reader 1720 may also store and transmit messages to the verification authority 1730 on a network that is available in real-time.

In some embodiments, when the reader 1720 stores responses from multiple tags, the reader 1720 may configure its transmissions to the verification authority 1730 to take advantage of batch transmission. For example, tag challenge 1714 may be sent to multiple tags simultaneously. If the reader 1720 stores responses from multiple tags to a single tag challenge, the reader 1720 may first transmit a subset (one or more) of the stored responses but only one copy of the tag challenge to the verification authority 1730. Subsequently, the reader 1720 may transmit more of the stored responses, but no further tag challenges, to the verification authority 1730.

Figure 18:
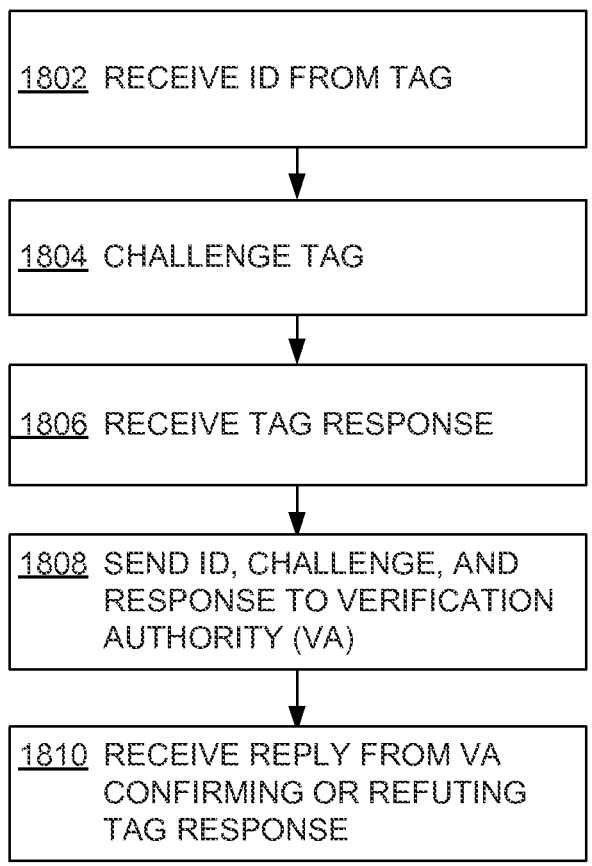
FIG. 18 is a flowchart illustrating a process for a reader authenticating a tag according to embodiments.

FIG. 18 is a flowchart illustrating a process 1800 for tag authentication according to embodiments. In step 1802, a reader (e.g., reader 1720 in FIG. 17) receives an identifier ID (e.g., ID 1034/1136 in FIGS. 10/11) from a tag (e.g., tag 1710 in FIG. 17). The reader then challenges the tag at step 1804 by transmitting a challenge to the tag (e.g., as part of authentication step 1308 in FIG. 13). In step 1806, the reader receives a challenge response from the tag. The reader then sends the ID, challenge, and response to a verification authority (e.g., verification authority 1730 in FIG. 17) in step 1808. Finally, in step 1810, the reader receives a reply from the verification authority confirming or refuting the tag response.

In some embodiments, a tag may itself wish to verify the authenticity of a reader before complying with commands from the reader. A tag may consider a reader authentic if the reader has access to a verification authority that has some knowledge of the tag (e.g., the tag TKEY and/or the tag's cryptographic algorithms) and/or knows the private key corresponding to a public key known by the tag. In order to determine whether a reader does in fact have access to such a verification authority, a tag may send a challenge to the reader, where a correct response to the challenge can only be generated by the verification authority. In some embodiments, the verification authority may also wish to verify the authenticity of a reader before responding to requests from the reader. Similar subject matter is described in commonly-assigned U.S. patent application Ser. No. 13/396,889 filed on Feb. 15, 2012, the entirety of which is incorporated by reference herein.

Figure 19:
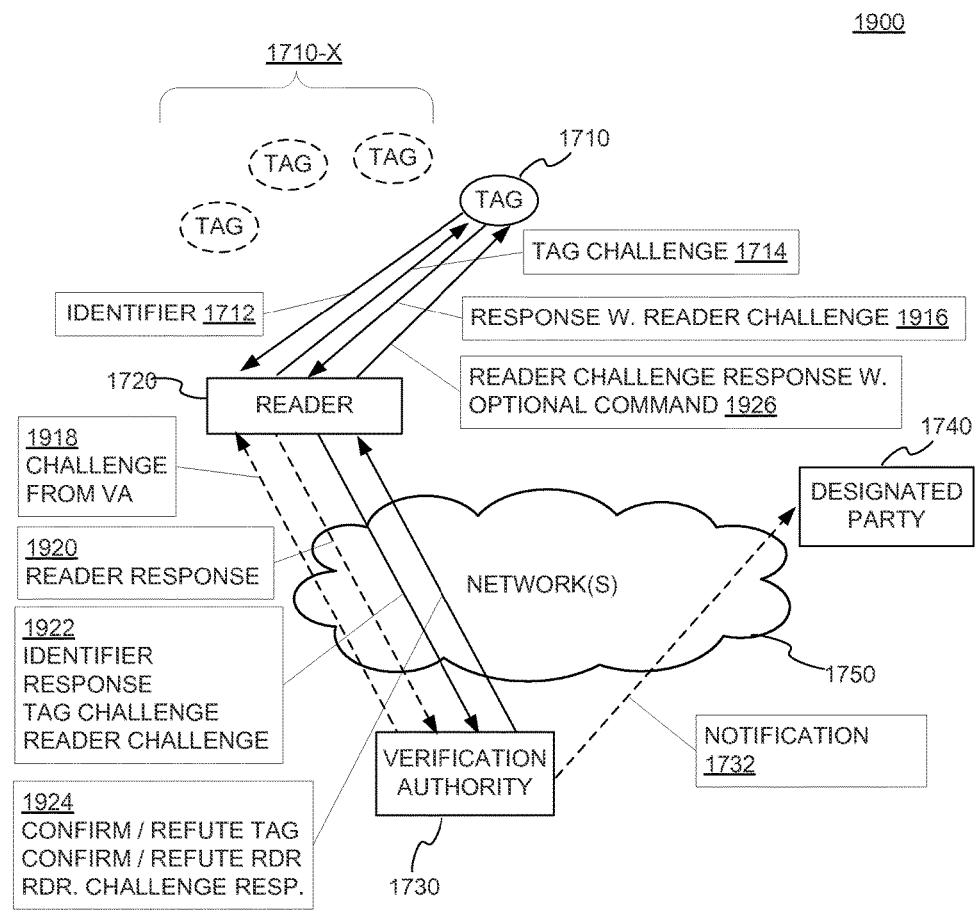
FIG. 19 is another diagram depicting interactions between an RFID reader, RFID tags, a verification authority, and a designated party according to embodiments.

FIG. 19 is another diagram 1900 depicting interactions between an RFID reader 1720, RFID tags 1710-X and 1710, a verification authority 1730, and a designated party 1740 according to embodiments. Diagram 1900 is similar to diagram 1700, with similarly-numbered elements behaving similarly. However, in diagram 1900 tag 1710 responds to the tag challenge 1714 by sending a reader challenge in addition to response 1916. Diagram 1900 depicts the reader challenge as included in response 1916, but in other embodiments the reader challenge may be in a different message. The reader challenge may include a first parameter that may be encrypted with a tag key (e.g., a tag private key TPRK or a tag secret key TKEY) or not. For example, the first parameter may include a random number generated by the tag or provided by reader 1720. Upon receiving response 1916, reader 1720 may determine that it includes a reader challenge by reading the included reader challenge or an included reader challenge indicator. Reader 1720 may then transmit a message 1922 with the identifier 1712, the tag challenge 1714, the response 1916, and optionally any indicators of tag-generated randomness (e.g., a tag IV) to verification authority 1730 over one or more networks 1750.

As mentioned above, in some embodiments the verification authority 1730 may need to authenticate reader 1720. In these embodiments, the verification authority 1730 transmits a challenge 1918 to the reader 1720, either before the verification authority 1730 receives message 1922 or in response to receiving message 1922. In response, the reader 1720 generates a reader response 1920, similar to how tag 1710 generates tag response 1916 (i.e., by using a stored reader secret, the reader challenge, and optionally reader-generated randomness). The reader 1720 then transmits the reader response 1920 to the verification authority 1730, either before transmitting message 1922, after transmitting message 1922, or along with (or embedded in) message 1922. In some embodiments, the reader 1720 also transmits the physical location of the reader when the challenge was issued to the tag 1710 and/or a reader identifier (not shown) to the verification authority 1730. In some embodiments, the reader 1720 may sign its transmitted messages with a reader electronic signature, which may help further indicate that the reader is legitimate/authentic.

In embodiments where the reader 1720 needs to be authenticated, the verification authority 1730 may wait to process the received message 1922 until the reader 1720 has been authenticated. The verification authority 1730 may authenticate the reader 1720 in the same way it authenticates received message 1922. For example, the verification authority 1730 may store or have access to information about the reader 1720 such as its secret and/or the cryptographic algorithm it uses, and may use this information, the challenge 1918, and the reader response 1920 to determine whether the reader 1720 is authentic (e.g., by computing a response and comparing it to the reader response 1920).

After the verification authority 1730 has determined the authenticity of the reader 1720, it may transmit a reader confirmation/refutation message to the reader 1720. The reader confirmation/refutation message may be transmitted separately (not shown) or in message 1924. In some embodiments, instead of transmitting a reader confirmation/refutation message, the verification authority 1730 may use the tag confirmation/refutation message 1924 as a proxy. For example, if the reader 1720 is confirmed to be authentic, the verification authority 91730 may send the tag confirmation/refutation message 1924. If, on the other hand, the reader 1720 is not determined to be authentic, the verification authority 1730 may not send the tag confirmation/refutation message 1924 in response to message 1922. The verification authority 1730 may even transmit a false tag confirmation/refutation message 1924 if the reader 1720 is determined to not be authentic, and then optionally alert a third party of the not-authentic reader.

In some embodiments, if the verification authority 1730 transmits a reader confirmation/refutation message to the reader 1720, the verification authority 1730 may transmit a tag confirmation/refutation message if tag authenticity is confirmed, if it is refuted, or may not transmit a tag confirmation/refutation message to the reader 1720 at all.

Verification authority 1730 may further include an indication of whether the authenticity of reader 1720 was confirmed or refuted in notification 1732. Verification authority 1730 may transmit notification 1732 if the authenticity of the tag 1710/reader 1720 is confirmed or refuted, only if tag/reader authenticity is confirmed, or only if tag/reader authenticity is refuted.

If verification authority 1730 considers reader 1720 authentic, in addition to verifying the authenticity of the response 1916 as described above in FIG. 17 it may also derive a second parameter from the reader challenge and send the second parameter in a reader challenge response back to reader 1720, either as part of message 1924 or in a separate message. Verification authority 1730, as described above, may store or have access to information about the tag 1710, such as its secret key TKEY and/or the encryption algorithm(s) it uses. In some embodiments, verification authority 1730 also (or instead) has access to a private key corresponding to a public key stored by tag 1710. Therefore, verification authority 1730 can reverse any cryptographic processing performed by tag 1710 on the first parameter in the reader challenge to derive a second parameter that tag 1710 (or another entity with the same information as tag 1710) can verify.

To derive the second parameter, verification authority 1730 may first determine the appropriate key to use for a particular tag based on identifier 1712. If the first parameter in the reader challenge is encrypted, verification authority 1730 then uses the key to recover the first parameter. Subsequently, verification authority 1730 may use the first parameter to derive a second parameter. For example, the second parameter may be set to be equal to the first parameter, include a string incorporating the first parameter, and/or include the result of an arithmetic or cryptographic function of the first parameter. The second parameter may be unencrypted or encrypted/electronically-signed with the determined key. For example, verification authority 1730 can derive the second parameter by decrypting an encrypted first parameter in the reader challenge, encrypting an unencrypted first parameter in the reader challenge, or electronically signing a response to the reader challenge.

Verification authority 170 can then send a reader challenge response including the second parameter back to tag 1710 via reader 1720, and tag 1710 can then use its secret key or a verification authority public key to verify that the received second parameter is authentic. If tag 1710 originally sent an encrypted first parameter, it can check if the received second parameter is valid by comparing it to the original, unencrypted first parameter. Likewise, if tag 1710 originally sent an unencrypted first parameter, it can check if the received second parameter corresponds to the unencrypted first parameter. If the reader challenge response includes an electronic signature, tag 1710 may verify the electronic signature using its TKEY (for message authentication codes) or the verification authority public key (for digital signatures).

After receiving message 1924 confirming or refuting the authenticity of tag 1710 as well as including a reader challenge response with the second parameter, reader 1720 may then transmit a message 1926 with the reader challenge response to tag 1710. In some embodiments, message 1926 may include a tag command with the second parameter either included in the tag command payload or accompanying the command. The included second parameter, if verified by tag 1710, authorizes tag 1710 to perform the command. This allows reader 1720 to authorize tag 1710 to perform otherwise restricted commands, such as reading to or writing from protected tag memory, adjusting certain tag counter values, adjusting a pointer to a memory location, adjusting a pointer to or the value of a key stored on the tag, or entering different tag operating states, without reader 1720 needing to know or provide a tag password. Of course, if message 1924 refutes the authenticity of tag 1710, reader 1720 may not send the second parameter or any other tag commands to tag 1710.

Figure 20:
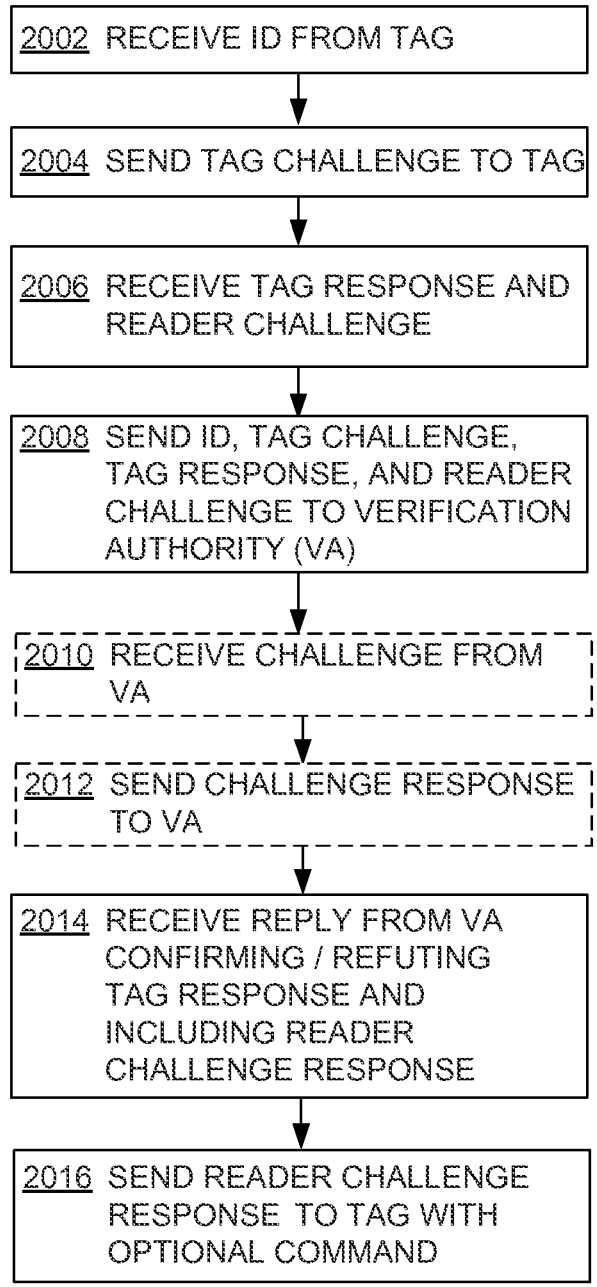
FIG. 20 is a flowchart illustrating a process for a reader authenticating itself and a tag according to embodiments.

FIG. 20 is a flowchart 2000 illustrating a process for a reader authenticating itself and a tag according to embodiments. At operation 2002, the reader receives an ID from a tag. At operation 2004, the reader sends a tag challenge to the tag. At operation 2006, the reader receives a tag response and a reader challenge from the tag. At operation 2008, the reader sends the ID, the tag challenge, the tag response, and the reader challenge to a verification authority. In some embodiments, the reader may not send the tag challenge to the verification authority, for example if the verification authority already knows the tag challenge. At optional operation 2010, the reader may receive a challenge from the verification authority for verifying reader authenticity. In response, at optional operation 2012 the reader may send a response to the verification authority challenge to the verification authority. At operation 2014, the reader receives a reply from the verification authority confirming or refuting the authenticity of the tag response, as well as including a response to the reader challenge. At operation 2016, the reader sends the reader challenge response to the tag, either alone or in combination with an optional tag command as described above. In some embodiments, the reader may refrain from sending the reader challenge response and/or the optional tag command if the verification authority indicates that the tag is not authentic.

In some embodiments, if the verification authority determines that the tag response is incorrect, it may not send a refuting reply to the reader, and may also not send a response to the reader challenge. In this situation, the reader may not perform operation 2012. If the verification authority does send a refuting reply and also a reader challenge response to the reader, the reader may still not send the reader challenge response to the tag because its authenticity has not been verified.

Figure 21:
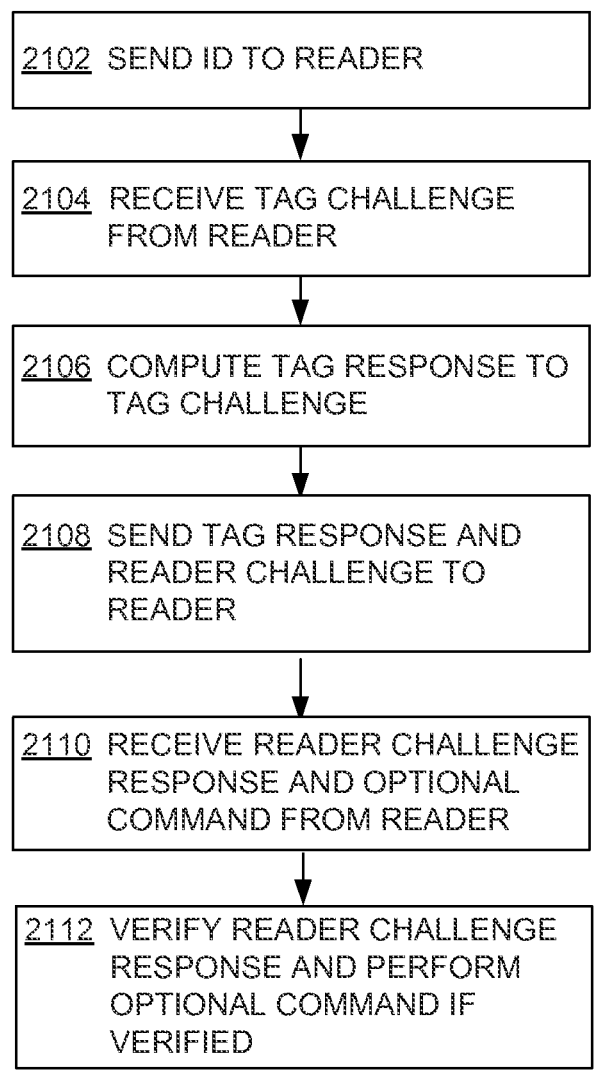
FIG. 21 is a flowchart illustrating a process for a tag to authenticate a reader according to embodiments.

FIG. 21 is a flowchart illustrating a process 2100 for a tag to authenticate a reader according to embodiments. At operation 2102, the tag sends an ID to a reader. At operation 2104, the tag receives a tag challenge from the reader. In response, the tag computes a tag response to the tag challenge at operation 2106. At operation 2108, the tag sends the computed tag response, as well as a reader challenge, to the reader. The reader challenge may include a first parameter such as a tag random number, and may be computed along with the tag response in operation 2106, may be computed beforehand, or may be computed after the tag response. Subsequently, at operation 2110 the tag receives a reader challenge response and an optional command from the reader. As described above, the reader challenge response may accompany the command or be included in the command payload along with a command code identifying the command and one or more tag instructions. At operation 2112, the tag first verifies the reader challenge response as described above (e.g., using TKEY or a verification authority public key), and in response to successfully verifying the reader challenge response executes the tag instructions included in the command. In some embodiments, the tag may wait to execute the tag instructions until another command is received and/or some trigger event occurs (e.g., tag power-up, tag power-down, timer expiration, or any other suitable event), which may be specified by the command or otherwise known to the tag.

The operations described in processes 1200, 1400, 1500, 1600, 1800, 2000, and 2100 are for illustrative purposes only. An RFID tag or reader authentication process may be implemented using additional or fewer operations and in different orders using the principles described herein.

Figure 22:
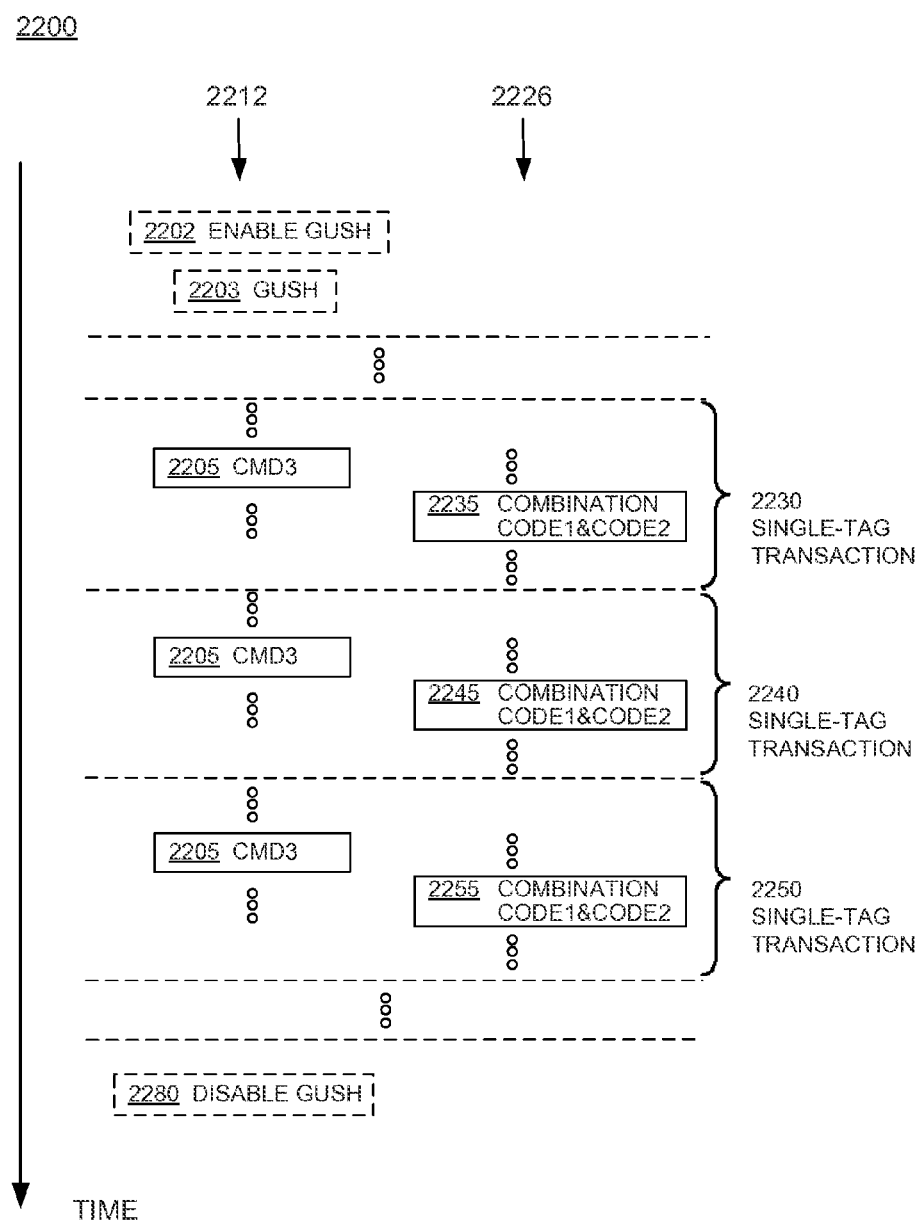
FIG. 22 is a timing diagram showing commands from an RFID reader and responses from a population of RFID tags for reading combinations of first and second codes of the tags according to embodiments.

In some embodiments, a tag IC may be configured to backscatter multiple codes (e.g., an ID, a coupon, electronic signatures, a TPK, or any other suitable code) in combination instead of one at a time, as described in U.S. patent application Ser. No. 13/423,256 filed on Mar. 18, 2012, which has been incorporated by reference. FIG. 22 is a timing diagram 2200 showing commands from an RFID reader and replies by a population of RFID tags according to embodiments. Neither the reader nor the tags are shown in diagram 2200. In some embodiments, the tags may store a first code and a second code (e.g., an ID, a coupon, electronic signatures, a TPK, or any other suitable codes). The commands in diagram 2200 cause tags to "gush" a reply comprising combinations of first and second codes, without any intervening reader commands between them, according to embodiments.

Timing diagram 2200 proceeds downward along a vertical axis TIME, with commands 2212 transmitted by the reader alternating with replies 2226 from the tags. In the example of diagram 2200, the reader first instructs the tags to gush their replies by means of one or more of an optional ENABLE GUSH command 2202 and a GUSH command 2203. In some embodiments at least one of the optional ENABLE GUSH command 2202 and the GUSH command 2203 may be broadcast simultaneously to multiple tags. Only one tag replies at a time, while the other tags are silent. During the time each tag is singulated the reader has a transaction with the singulated tag and receives tag data. Three example transactions 2230, 2240, 2250 are described, but more or less such transactions may take place. Each transaction 2230, 2240, 2250 is not necessarily described in full, but only some pertinent commands are given. Not shown are commands, for example, to singulate each tag for its transaction. Finally, an optional DISABLE GUSH command 2280, which may be broadcast to multiple tags, may terminate the gushing behavior.

In first transaction 2230 with a first singulated tag, command CMD3 2205 causes the first tag to send a reply comprising a combination 2235 of at least a portion of code1 and at least a portion of code2 from tag memory, without the tag receiving a reader command in-between sending the two code portions. In transaction 2240 with a second singulated tag, a repeated command CMD3 2205 elicits a combination 2245 from the second tag, again with no intervening command. Then in transaction 2250 with a third singulated tag, a repeated command CMD3 2205 elicits a combination 2255 from the third tag, again with no intervening command.

In some embodiments transactions 2230, 2240, and 2250 may take less time than transactions that involve receiving the first code and the second code separately, with an intervening reader command in between.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) system to cause an RFID tag having a first parameter to execute an instruction, the method comprising:
   sending a first command to the tag;
   receiving from the tag at least an identifier and an encrypted version of the first parameter;
   determining a key using the received identifier;
   recovering the first parameter from the encrypted version using the key;
   sending, at a first time, to the tag a single second command including the first parameter and a tag instruction; and
   causing the tag to execute the tag instruction upon verifying the first parameter.

2. The method of claim 1, wherein the first parameter is not based on the tag instruction.

3. The method of claim 1, wherein the second command further includes a command code indicating the tag instruction.

4. The method of claim 1, further comprising:
   sending the encrypted version of the first parameter to a verification authority; and
   receiving a derived second parameter from the verification authority, wherein the verification authority determines the key and recovers the first parameter from the encrypted version.

5. The method of claim 1, further comprising:
   sending a random number to the tag with the first command;
   receiving a cryptographic function of the random number from the tag;
   verifying an authenticity of the tag using the random number; and
   sending the second command to the tag only if the authenticity of the tag is verified.

6. The method of claim 1, wherein the tag instruction includes at least one of:
   reading from a tag memory;
   writing to a tag memory;
   adjusting a tag counter value;
   adjusting a pointer to a memory location;
   adjusting a pointer to a key;
   adjusting a value of a key; and
   causing the tag to change state.

7. The method of claim 1, wherein causing the tag to execute the tag instruction includes at least one of:
   sending the second command;
   sending a third command; and
   specifying a trigger event.

8. A method for a Radio Frequency Identification (RFID) system to cause an RFID tag having a first parameter to execute an instruction, the method comprising:
   sending a first command to the tag;
   receiving from the tag at least an identifier and an encrypted version of the first parameter;
   determining a key using the received identifier;
   recovering the first parameter from the encrypted version using the key;
   deriving a second parameter from the first parameter using a deriving operation that includes one of:
      setting the second parameter equal to the first parameter;
      incorporating the first parameter into a string; and
      computing an arithmetic function of at least the first parameter;
   sending, at a first time, to the tag a single second command including the second parameter and a tag instruction, wherein the first parameter and the second parameter are independent of the tag instruction; and
   causing the tag to, upon verifying the second parameter using the deriving operation and the first parameter, execute the tag instruction.

9. The method of claim 8, wherein the second command further includes a command code indicating the tag instruction.

10. The method of claim 4, further comprising:
    sending the encrypted version of the first parameter to a verification authority; and
    receiving the derived second parameter from the verification authority, wherein the verification authority determines the key, recovers the first parameter from the encrypted version, and derives the second parameter from the first parameter.

11. The method of claim 8, further comprising:
    sending a random number to the tag with the first command;
    receiving a cryptographic function of the random number from the tag;
    verifying an authenticity of the tag using the random number; and
    sending the second command to the tag only if the authenticity of the tag is verified.

12. The method of claim 11, wherein verifying the authenticity of the tag comprises:
    sending the cryptographic function and the random number to a verification authority; and
    receiving an indication of tag authenticity from the verification authority.

13. The method of claim 8, wherein the tag instruction includes at least one of:
reading from a tag memory;
writing to a tag memory;
adjusting a tag counter value;
adjusting a pointer to a memory location;
adjusting a pointer to a key;
adjusting a value of a key; and
causing the tag to change state.

14. The method of claim 8, wherein causing the tag to execute the tag instruction includes at least one of:
sending the second command;
sending a third command; and
specifying a trigger event.

15. A method for a Radio Frequency Identification (RFID) system to cause an RFID tag having a first parameter to execute an instruction, the method comprising:
sending a first command to the tag;
receiving from the tag at least an identifier and an encrypted version of the first parameter;
determining a key using the received identifier;
recovering the first parameter from the encrypted version using the key;
deriving a second parameter from the first parameter;
sending, at a first time, to the tag a single second command including the second parameter and a tag instruction, wherein the first parameter and the second parameter are independent of the tag instruction; and
causing the tag to, upon verifying the second parameter using the deriving operation and the first parameter, execute the tag instruction.

16. The method of claim 15, wherein the second command further includes a command code indicating the tag instruction.

17. The method of claim 15, further comprising:
sending the encrypted version of the first parameter to a verification authority; and
receiving the derived second parameter from the verification authority, wherein the verification authority determines the key, recovers the first parameter from the encrypted version, and derives the second parameter from the first parameter.

18. The method of claim 15, further comprising:
sending a random number to the tag with the first command;
receiving a cryptographic function of the random number from the tag;
verifying an authenticity of the tag using the random number; and
sending the second command to the tag only if the authenticity of the tag is verified.

19. The method of claim 15, wherein the tag instruction includes at least one of:
reading from a tag memory;
writing to a tag memory;
adjusting a tag counter value;
adjusting a pointer to a memory location;
adjusting a pointer to a key;
adjusting a value of a key; and
causing the tag to change state.

20. The method of claim 15, wherein causing the tag to execute the tag instruction includes at least one of:
sending the second command;
sending a third command; and
specifying a trigger event.

* * * * *